US012641269B2

(12) United States Patent
Filippov et al.

(10) Patent No.: US 12,641,269 B2
(45) Date of Patent: May 26, 2026

(54) POSITION DEPENDENT REFERENCE SAMPLE SMOOTHING

(71) Applicant: Ofinno, LLC, Reston, VA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 12 days.

(21) Appl. No.: 18/413,700

(22) Filed: Jan. 16, 2024

(65) Prior Publication Data

US 2024/0171763 A1 May 23, 2024

Related U.S. Application Data

(63) Continuation of application No. PCT/US2022/037099, filed on Jul. 14, 2022.
(Continued)

(51) Int. Cl.
*H04N 19/44* (2014.01)
*H04N 19/132* (2014.01)
*H04N 19/80* (2014.01)

(52) U.S. Cl.
CPC ........... *H04N 19/44* (2014.11); *H04N 19/132* (2014.11); *H04N 19/80* (2014.11)

(58) Field of Classification Search
CPC ...... H04N 19/44; H04N 19/132; H04N 19/80; H04N 19/82; H04N 19/11; H04N 19/593; G06T 3/4007
See application file for complete search history.

(56) References Cited

U.S. PATENT DOCUMENTS

| 11,039,148 B2 | 6/2021 | Moon et al. |
| 11,277,644 B2 | 3/2022 | Van der Auwera et al. |
| | (Continued) | |

FOREIGN PATENT DOCUMENTS

| WO | 2020/260188 A1 | 12/2020 |
| WO | 2021/126017 A2 | 6/2021 |

OTHER PUBLICATIONS

Draft ISO/IEC 23090-3:202x 2nd Edition (E); ISO/IEC JTC 1/SC 29/WG 5; Secretariat: JISC (Japan); Information technology—Coded representation of immersive media—Part 3: Versatile video coding; ISO/IEC 2021; Published in Switzerland.
(Continued)

*Primary Examiner* — Hesham K Abouzahra
(74) *Attorney, Agent, or Firm* — Shan He; Kavon Nasabzadeh; Jacob L. Mangan

(57) ABSTRACT

An encoder or decoder interpolates between a first reference sample and a second reference sample to determine an interpolated value at a point on a reference sample line to which a location of a sample is projected. The interpolating includes applying a first filter coefficient, determined based on a product of a first function and a second function that is inversely related to a distance of the point from the first reference sample, to the first reference sample and also applying a second filter coefficient, determined based on a product of the first function and a third function that is inversely related to a distance of the point from the second reference sample, to the second reference sample. The first function is inversely related to a distance of the point from a closest integer position on the reference sample line. The interpolated value is used to predict the sample.

20 Claims, 23 Drawing Sheets

Related U.S. Application Data

(60) Provisional application No. 63/222,151, filed on Jul. 15, 2021.

(56) References Cited

U.S. PATENT DOCUMENTS

| | | | |
|---|---|---|---|
| 11,558,604 B2 * | 1/2023 | Rath | H04N 19/593 |
| 2016/0373743 A1 | 12/2016 | Zhao et al. | |
| 2020/0036970 A1 * | 1/2020 | Yoo | H04N 19/157 |
| 2021/0127122 A1 | 4/2021 | Filippov et al. | |
| 2021/0337238 A1 | 10/2021 | Filippov et al. | |

OTHER PUBLICATIONS

Pfaff et al.; "Intra Prediction and Mode Coding in VVC"; IEEE Transactions on Circuits and Systems for Video Technology, vol. 31, No. 10, Oct. 2021; pp. 3834-3847.

Filippov et al.; "Intra Prediction in the Emerging VVC Video Coding Standard"; Data Compression Conference 2020.

International Search Report and Written Opinion of the International Searching Authority mailed Nov. 2, 2022 in International Application No. PCT/US2022/037099.

Pfaff et al.; "Intra Prediction and Mode Coding in VVC"; IEEE Transactions on Circuits and Systems for Video Technology, vol. 31, No. 10, pp. 3834-3847, Oct. 2021.

JVET-V2002-vl; Joint Video Experts Team (JVET) of ITU-T SG 16 WP 3 and ISO/IEC JTC 1/SC 29; 22nd Meeting, by teleconference, Apr. 20-28, 2021; Title: Algorithm description for Versatile Video Coding and Test Model 13 (VTM 13); Status: Output document of JVET; Purpose: Algorithm description for Versatile Video Coding and Test Model 13 Author(s): Jianle Chen et al.; Source: Editors.

* cited by examiner

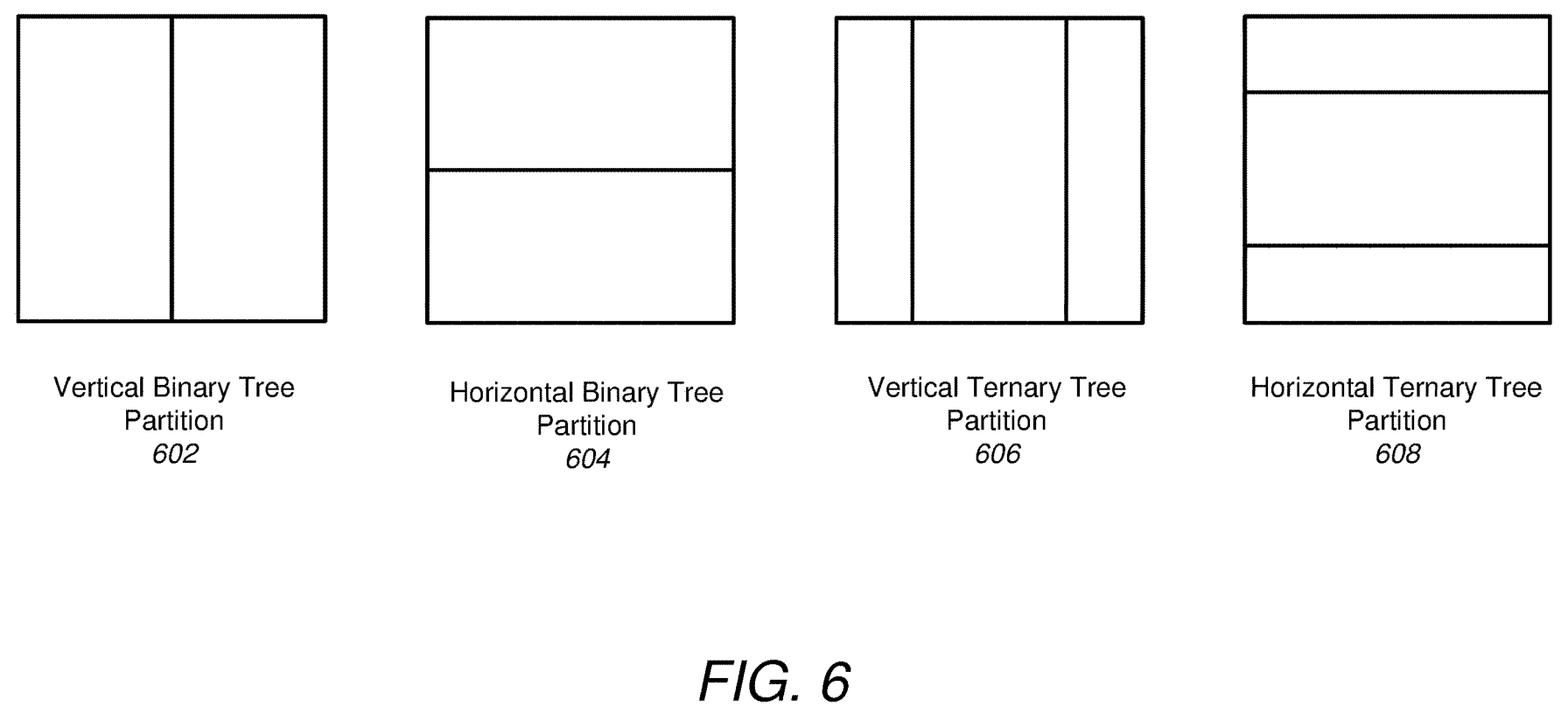

Horizontal Ternary Tree
Partition
*608*

Vertical Ternary Tree
Partition
*606*

Horizontal Binary Tree
Partition
*604*

Vertical Binary Tree
Partition
*602*

*FIG. 6*

0: Planar
1: DC

0: Planar
1: DC

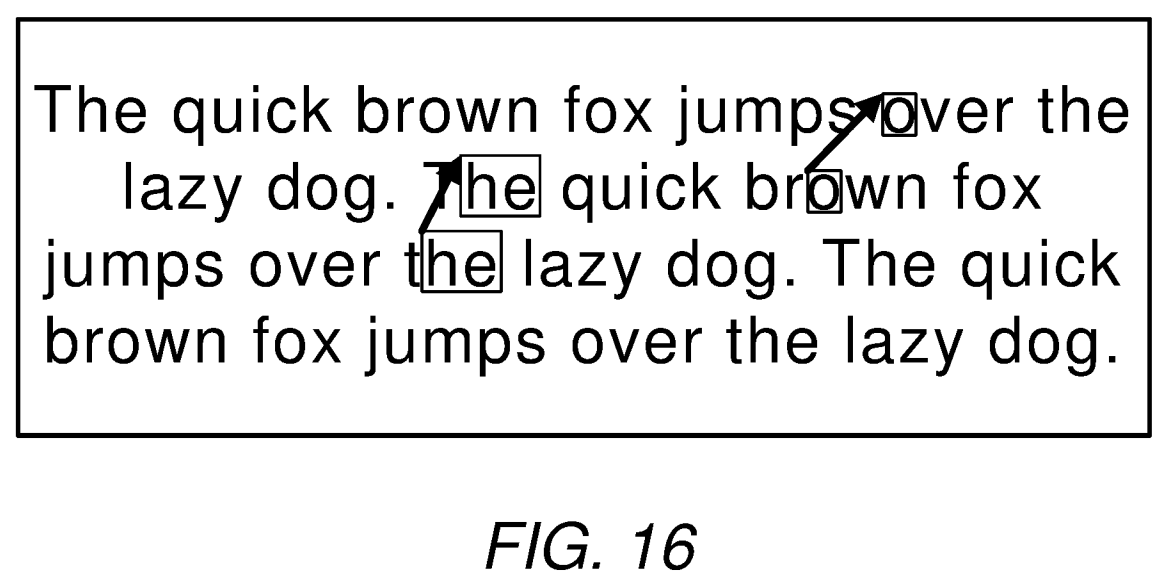

The quick brown fox jumps over the lazy dog. The quick brown fox jumps over the lazy dog. The quick brown fox jumps over the lazy dog.

*FIG. 16*

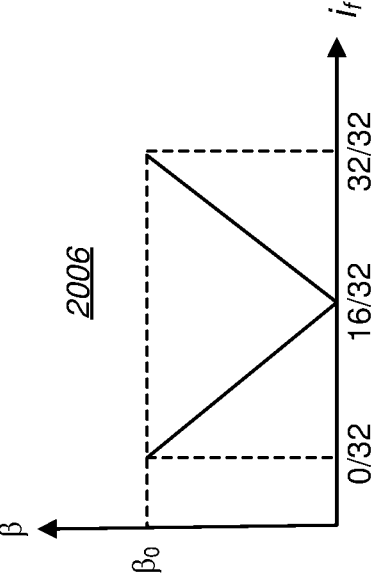
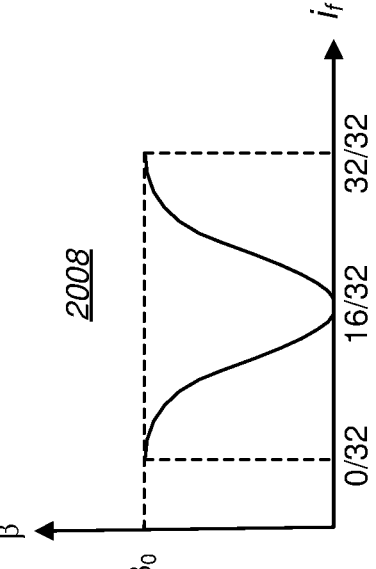
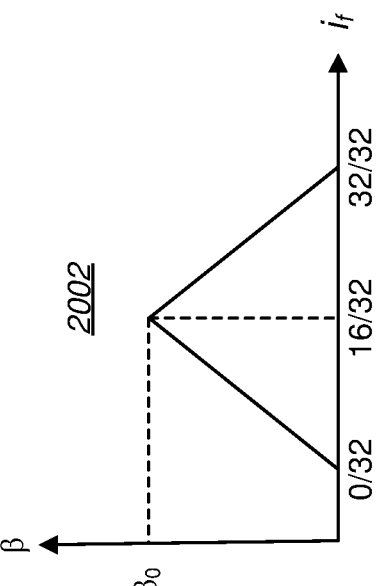
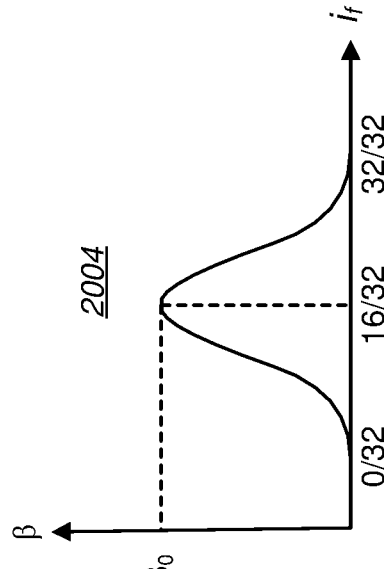
*FIG. 20*

$$f_{s1}[n] = \begin{cases} \frac{1}{4} * (1-i_f), & n = 0 \\ \frac{1}{2} * (1-i_f), & n = 1 \\ \frac{1}{4} * (1-i_f), & n = 2 \\ 0, & n = 3 \end{cases}$$

$$f_{s2}[n] = \begin{cases} 0, & n = 0 \\ \frac{1}{4} * i_f, & n = 1 \\ \frac{1}{2} * i_f, & n = 2 \\ \frac{1}{4} * i_f, & n = 3 \end{cases}$$

$$f_i[n] = \begin{cases} 0, & n = 0 \\ 1-i_f, & n = 1 \\ i_f, & n = 2 \\ 0, & n = 3 \end{cases}$$

Figure 23:
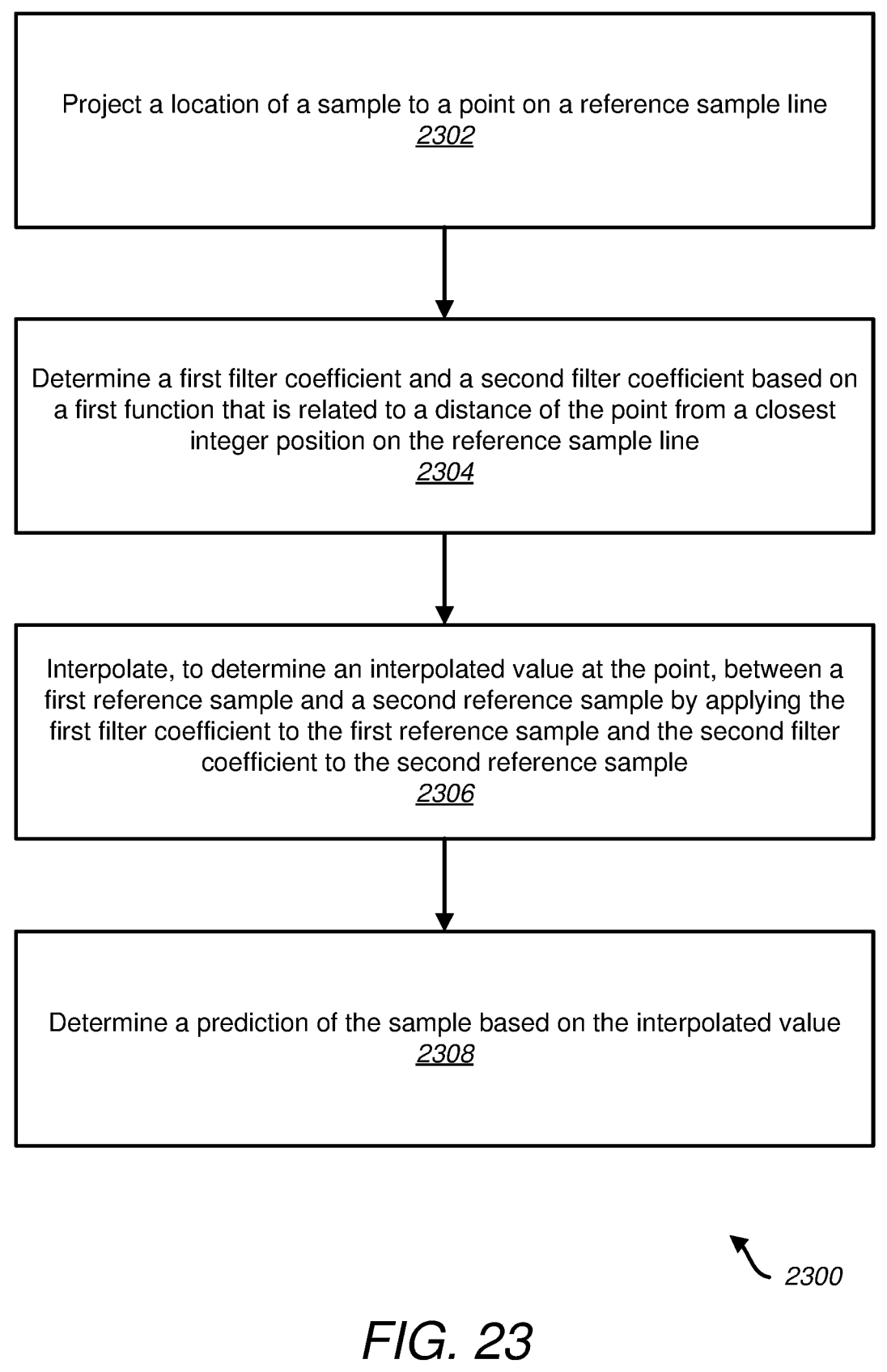

Project a location of a sample to a point on a reference sample line
2302

Determine a first filter coefficient and a second filter coefficient based on a first function that is related to a distance of the point from a closest integer position on the reference sample line
2304

Interpolate, to determine an interpolated value at the point, between a first reference sample and a second reference sample by applying the first filter coefficient to the first reference sample and the second filter coefficient to the second reference sample
2306

Determine a prediction of the sample based on the interpolated value
2308

Figure 24:
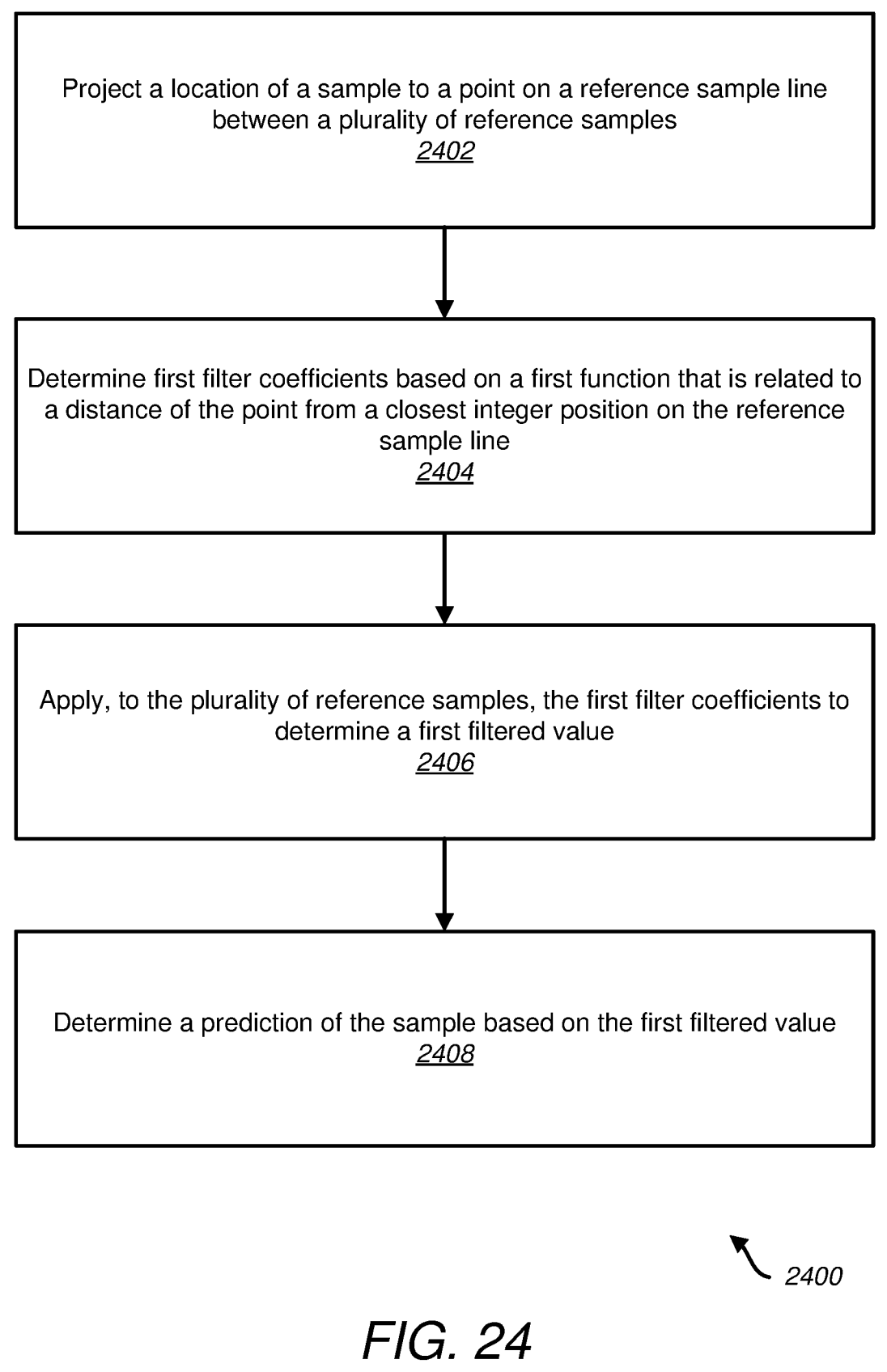

Project a location of a sample to a point on a reference sample line
between a plurality of reference samples
2402

Determine first filter coefficients based on a first function that is related to
a distance of the point from a closest integer position on the reference
sample line
2404

Apply, to the plurality of reference samples, the first filter coefficients to
determine a first filtered value
2406

Determine a prediction of the sample based on the first filtered value
2408

Processor
2504

Main Memory
2506

Communication
Infrastructure
2502

Secondary Memory
2508

Hard Disk Drive
2510

Removable
Storage Drive
2512

Interface
2514

Removable
Storage Unit
2516

Removable
Storage Unit
2518

Communication
Interface
2520

Communication Path
2522

2500

POSITION DEPENDENT REFERENCE SAMPLE SMOOTHING

CROSS-REFERENCE TO RELATED APPLICATIONS

This application is a continuation of International Application No. PCT/US2022/037099, filed Jul. 14, 2022, which claims the benefit of U.S. Provisional Application No. 63/222,151, filed Jul. 15, 2021, which are hereby incorporated by reference in their entireties.

BRIEF DESCRIPTION OF THE DRAWINGS

Examples of several of the various embodiments of the present disclosure are described herein with reference to the drawings.

FIG. 6 illustrates example binary and ternary tree partitions in accordance with embodiments of the present disclosure.

FIG. 16 illustrates an example of IBC applied for screen content in accordance with embodiments of the present disclosure.

FIG. 20 illustrates four plots of example $\beta$ functions that may be used by smoothing interpolation filters, such as the smoothing interpolation filters in FIG. 19, in accordance with embodiments of the present disclosure.

FIG. 23 illustrates a flowchart of a method for determining a prediction of a sample based on an interpolated value in accordance with embodiments of the present disclosure.

FIG. 24 illustrates a flowchart of a method for determining a prediction of a sample in accordance with embodiments of the present disclosure.

DETAILED DESCRIPTION

Figure 1:
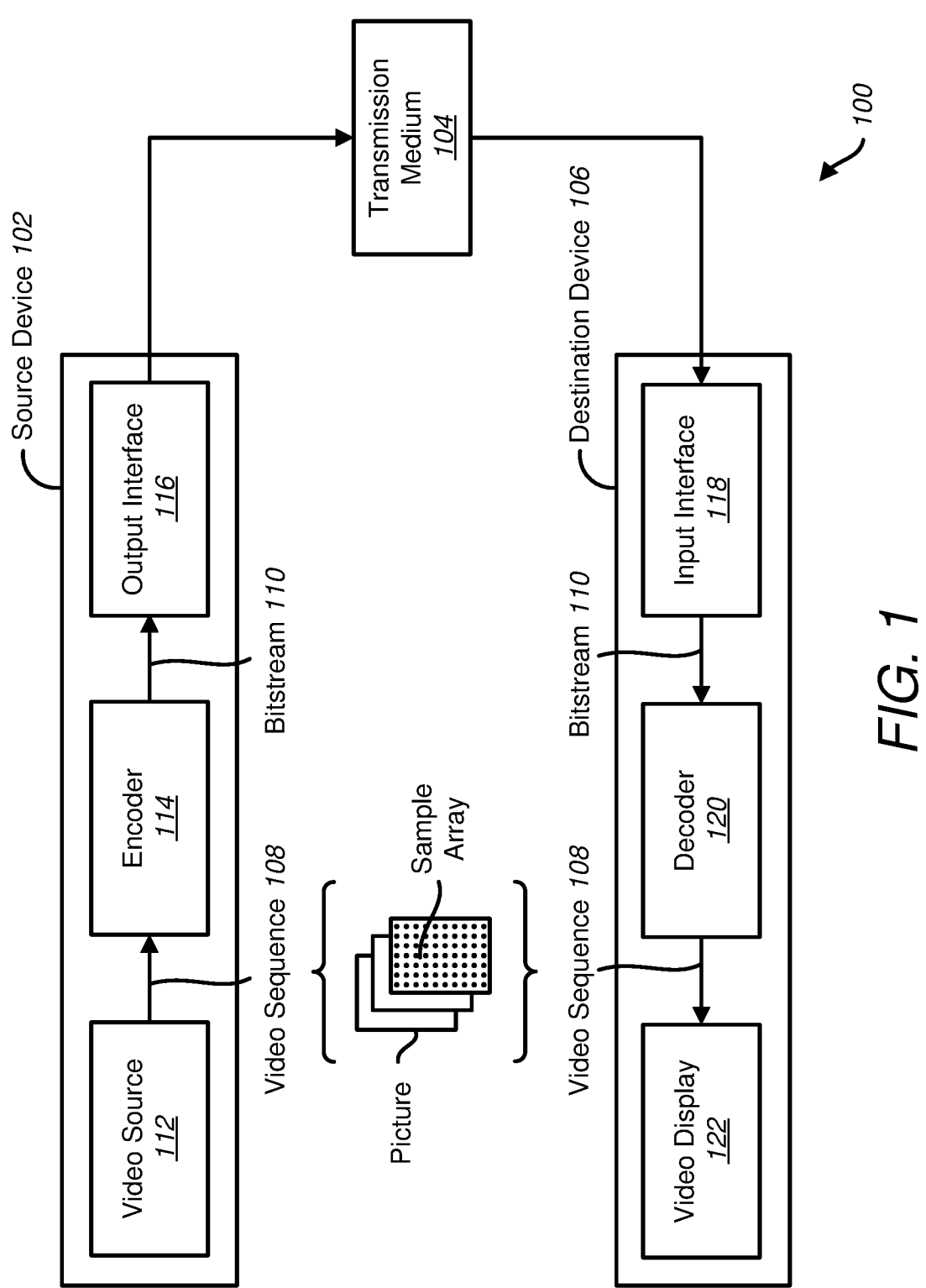
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or transmit bitstream 110 to destination device 106 via transmission medium 104. Destination device 106 decodes bitstream 110 to display video sequence 108. Destination device 106 may receive bitstream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming bitstream 110 to further reduce the number of bits needed to store and/or transmit video sequence 108.

Output interface 116 may be configured to write and/or store bitstream 110 onto transmission medium 104 for transmission to destination device 106. In addition or alternatively, output interface 116 may be configured to transmit, upload, and/or stream bitstream 110 to destination device 106 via transmission medium 104. Output interface 116 may comprise a wired and/or wireless transmitter configured to transmit, upload, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode bitstream 110 into video sequence 108 for display, destination device 106 may comprise an input interface 118, a decoder 120, and a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as those mentioned above.

Decoder 120 may decode video sequence 108 from encoded bitstream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in bitstream 110 and determine the prediction errors using transform coefficients also received in bitstream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bitstream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display 122 may be external to destination device 106 or omitted altogether where video sequence is intended for consumption by a machine and/or storage device. In another example, source device 102 may further comprise a video decoder and destination device 106 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
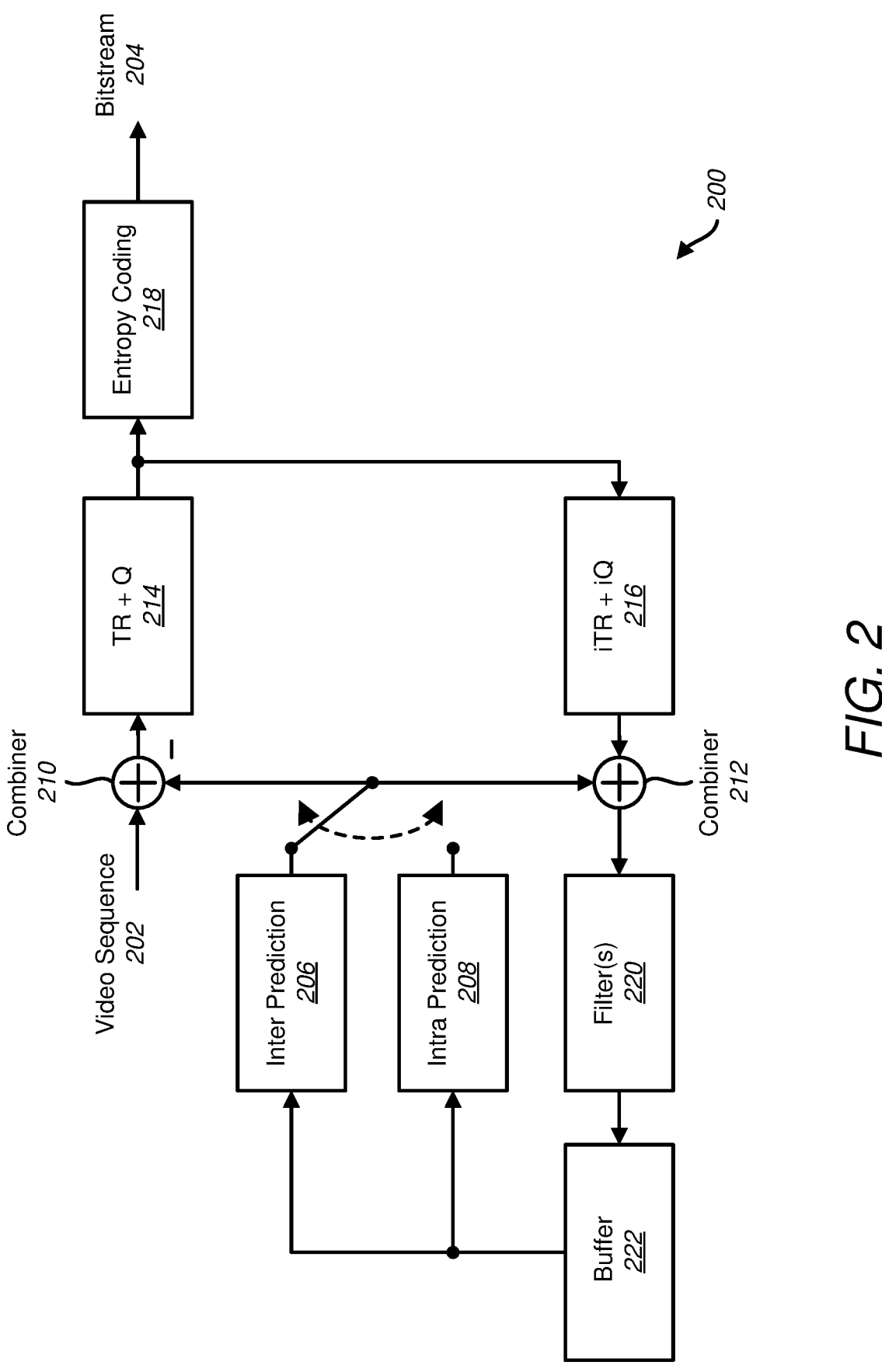
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into a bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that bitstream 204 is generated in conformance with the requirements of any one of a number of proprietary or industry video coding standards. For example, The encoder control unit may control the one or more units of encoder 200 such that bitstream 204 is generated in conformance with one or more of ITU-T H.263, AVC, HEVC, VVC, VP8, VP9, and AV1 video coding standards. Within the constraints of a proprietary or industry video coding standard, the encoder control unit may attempt to minimize or reduce the bitrate of bitstream 204 and maximize or increase the reconstructed video quality. For example, the encoder control unit may attempt to minimize or reduce the bitrate of bitstream 204 given a level that the reconstructed video quality may not fall below, or attempt to maximize or increase the reconstructed video quality given a level that the bit rate of bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
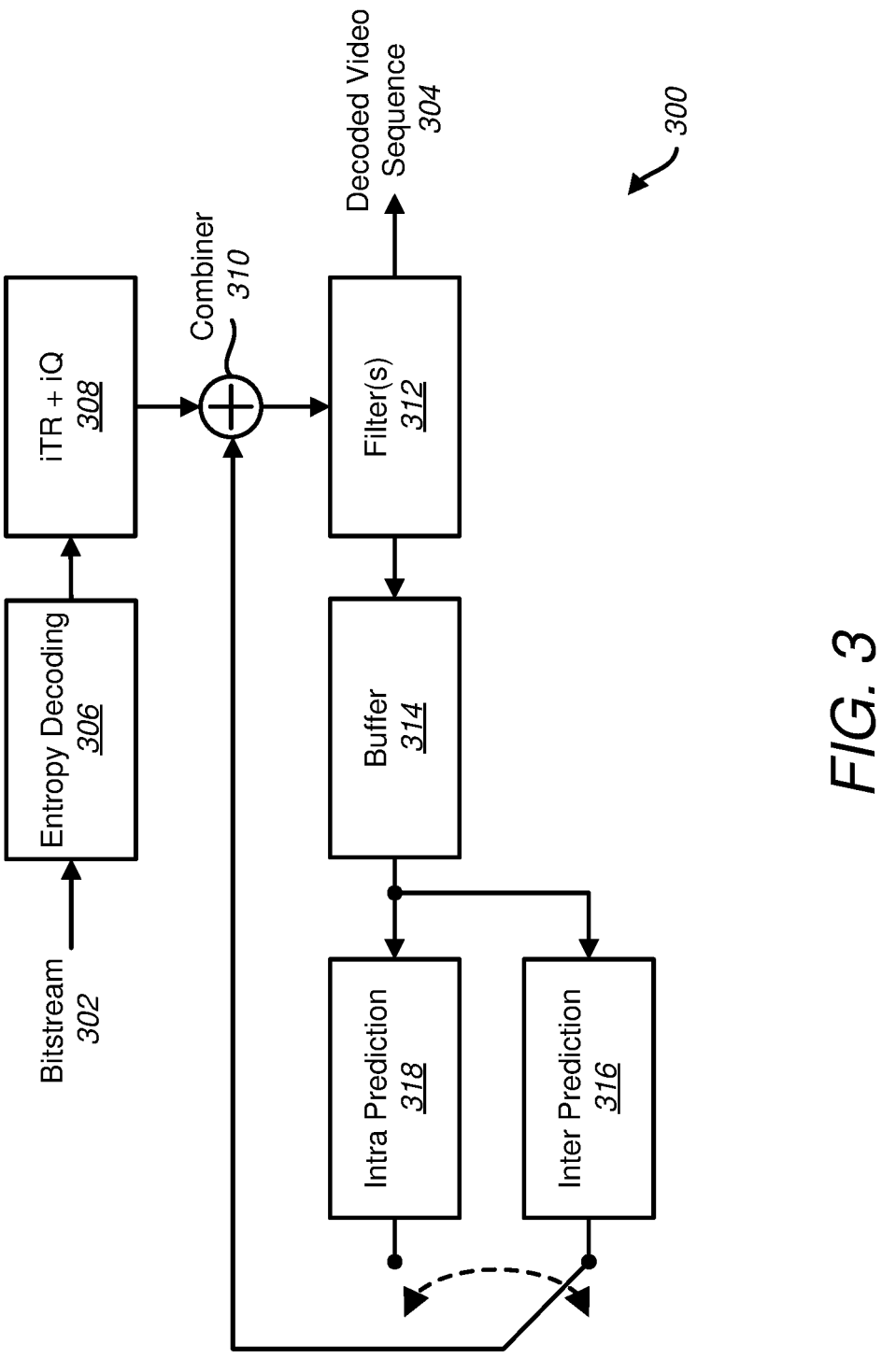
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that bitstream 302 is decoded in conformance with the requirements of any one of a number of proprietary or industry video coding standards. For example, The decoder control unit may control the one or more units of decoder 300 such that bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bit-stream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block parti-tions may be used in areas of a picture with higher levels of homogeneity to improve coding efficiency.

In HEVC, a picture may be partitioned into non-overlap-ping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half ver-tical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may deter-mine an applied transform size.

Figure 4:
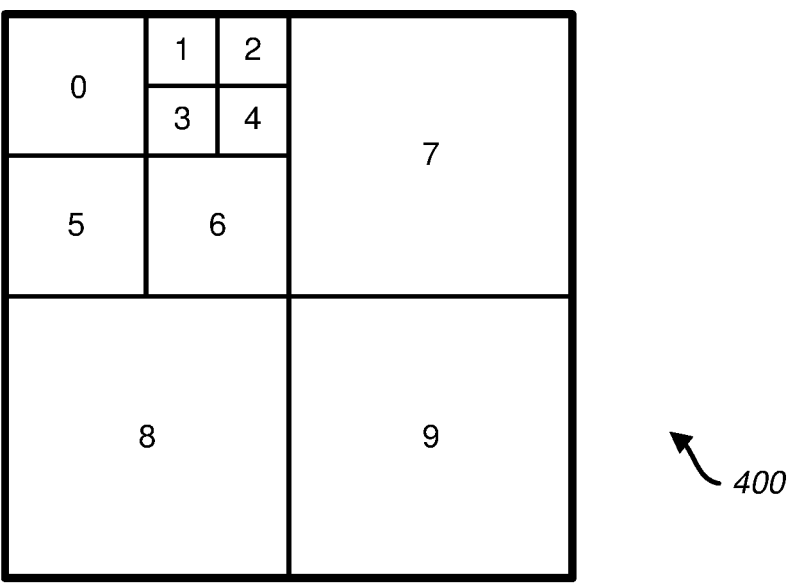
FIG. 4 illustrates an example quadtree partitioning of a coding tree block (CTB) in accordance with embodiments of the present disclosure.
Figure 5:
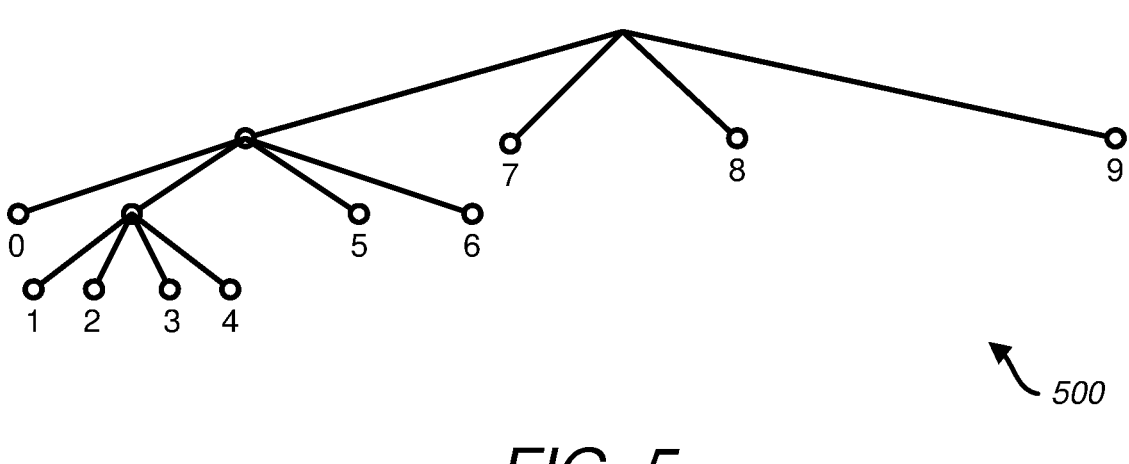
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

In VVC, a picture may be partitioned in a similar manner as in HEVG. A picture may be first partitioned into non-overlapping square CTBs. The CTBs may then be parti-tioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The result-ing partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
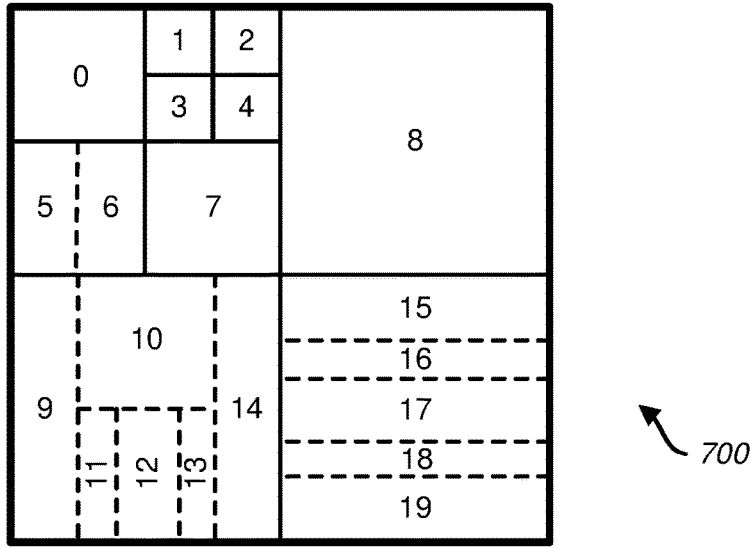
FIG. 7 illustrates an example quadtree+multi-type tree partitioning of a CTB in accordance with embodiments of the present disclosure.
Figure 8:
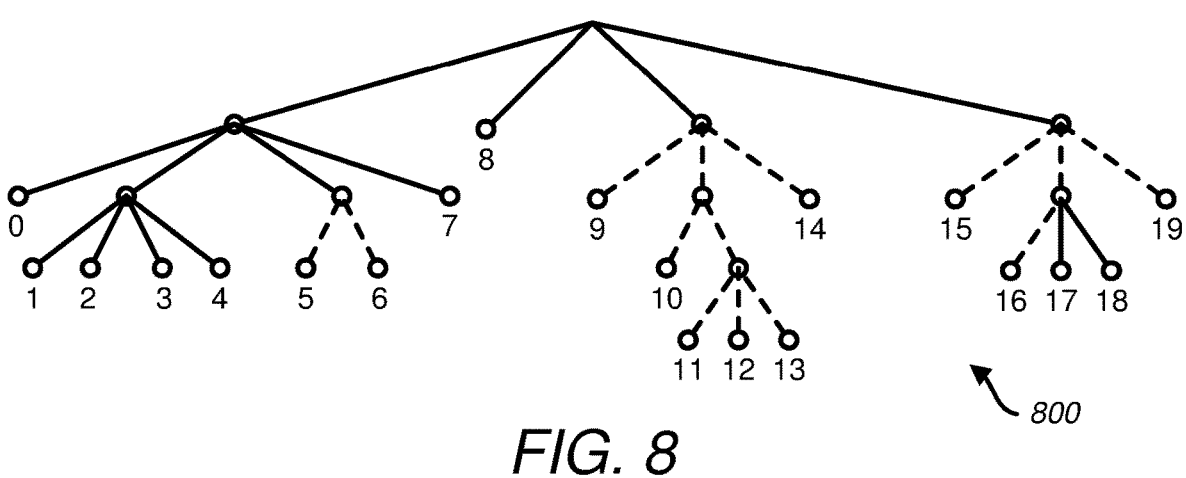
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree parti-tioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respec-tively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
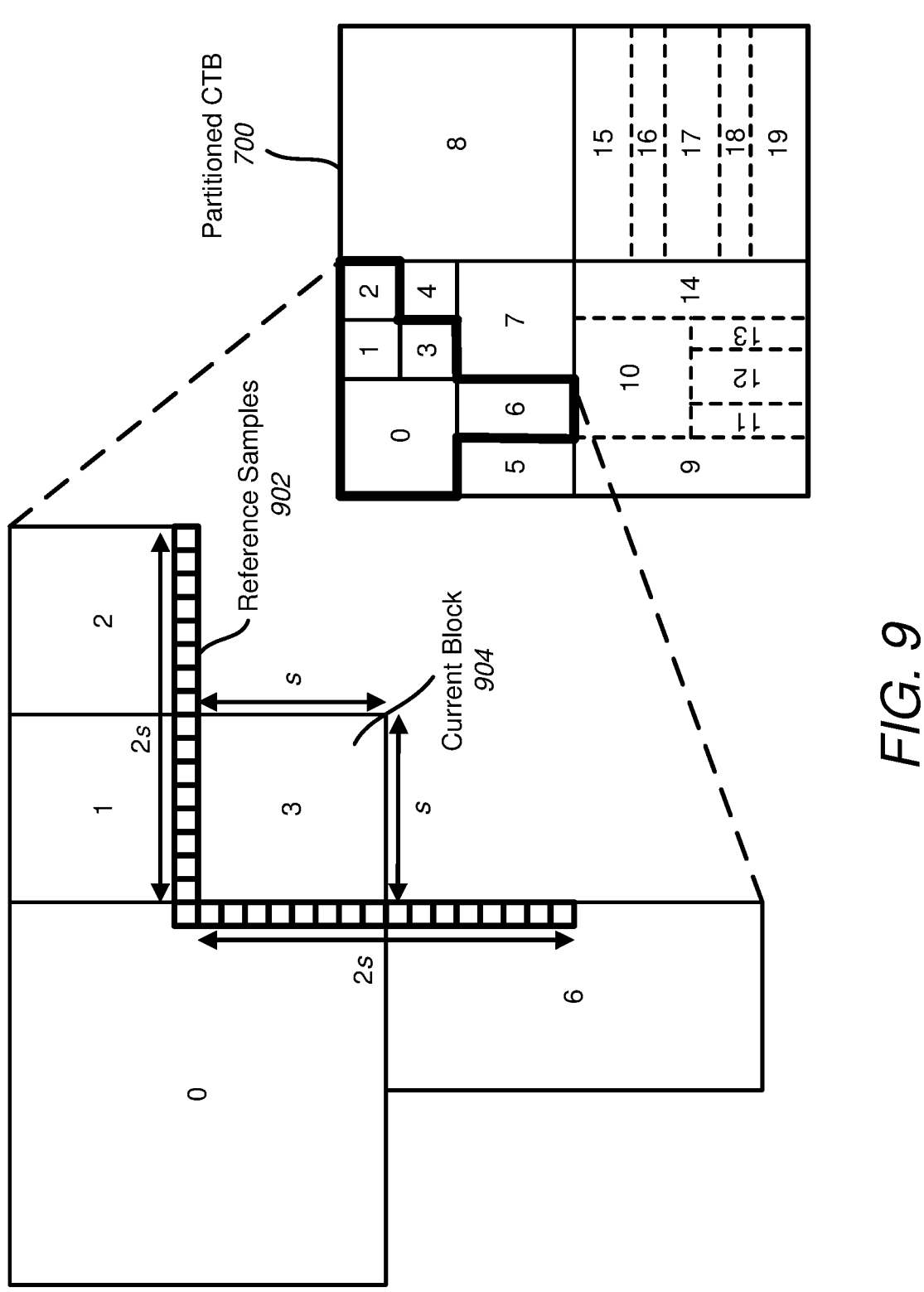
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
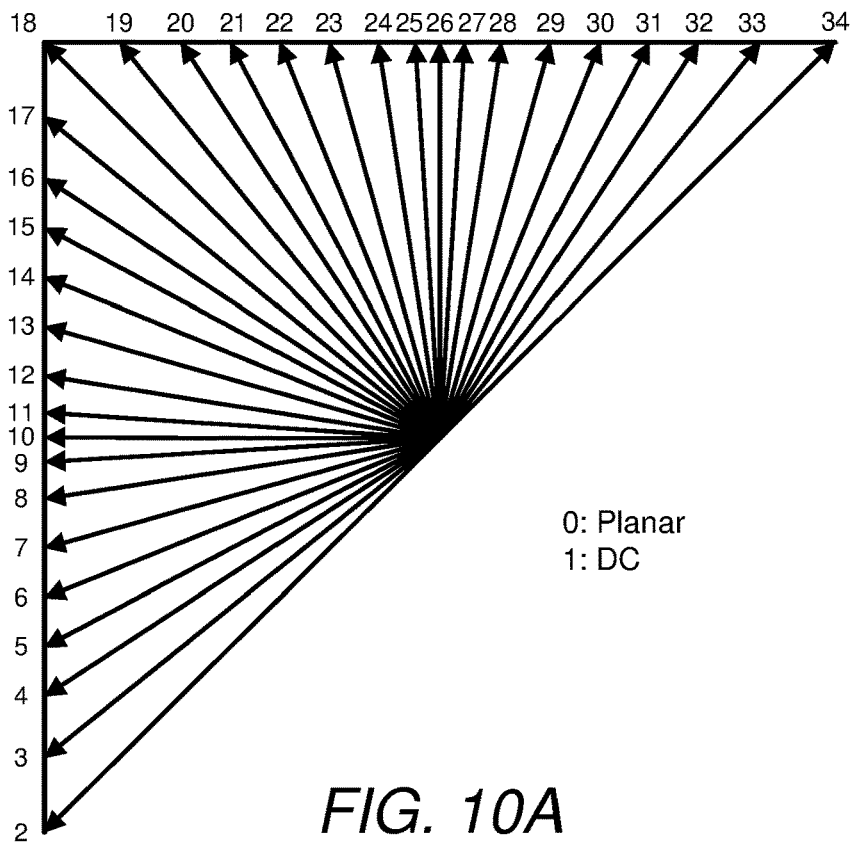
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
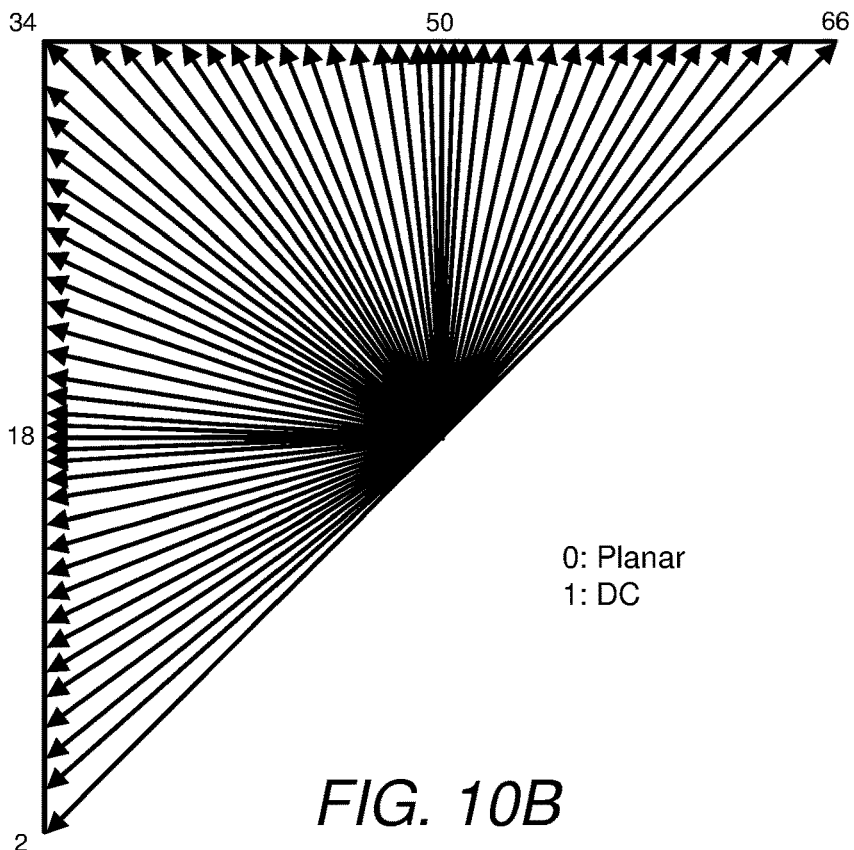
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
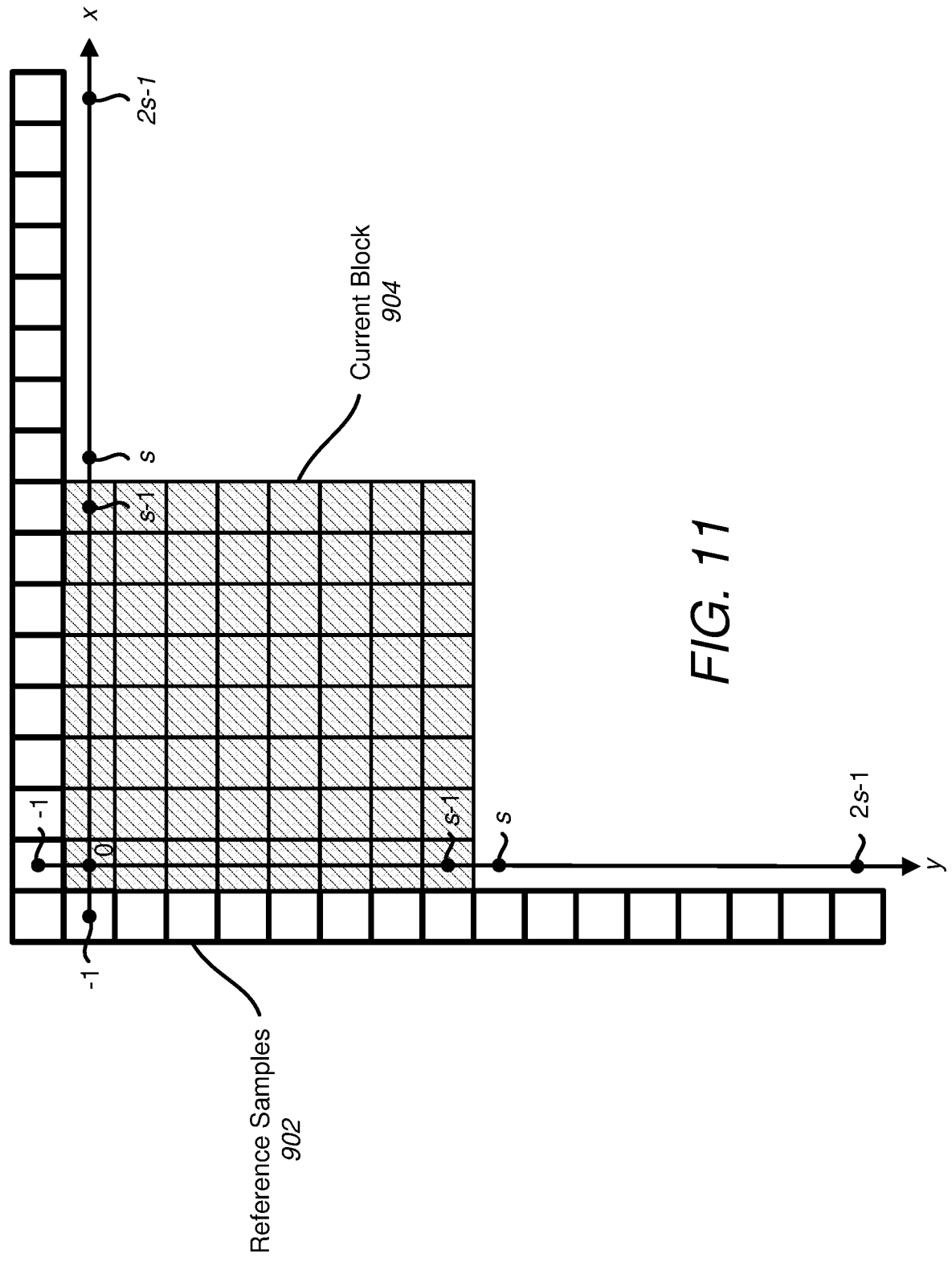
FIG. 11 illustrates the current block and reference samples from FIG. 9 in a two-dimensional x, y plane in accordance with embodiments of the present disclosure.
Figure 12:
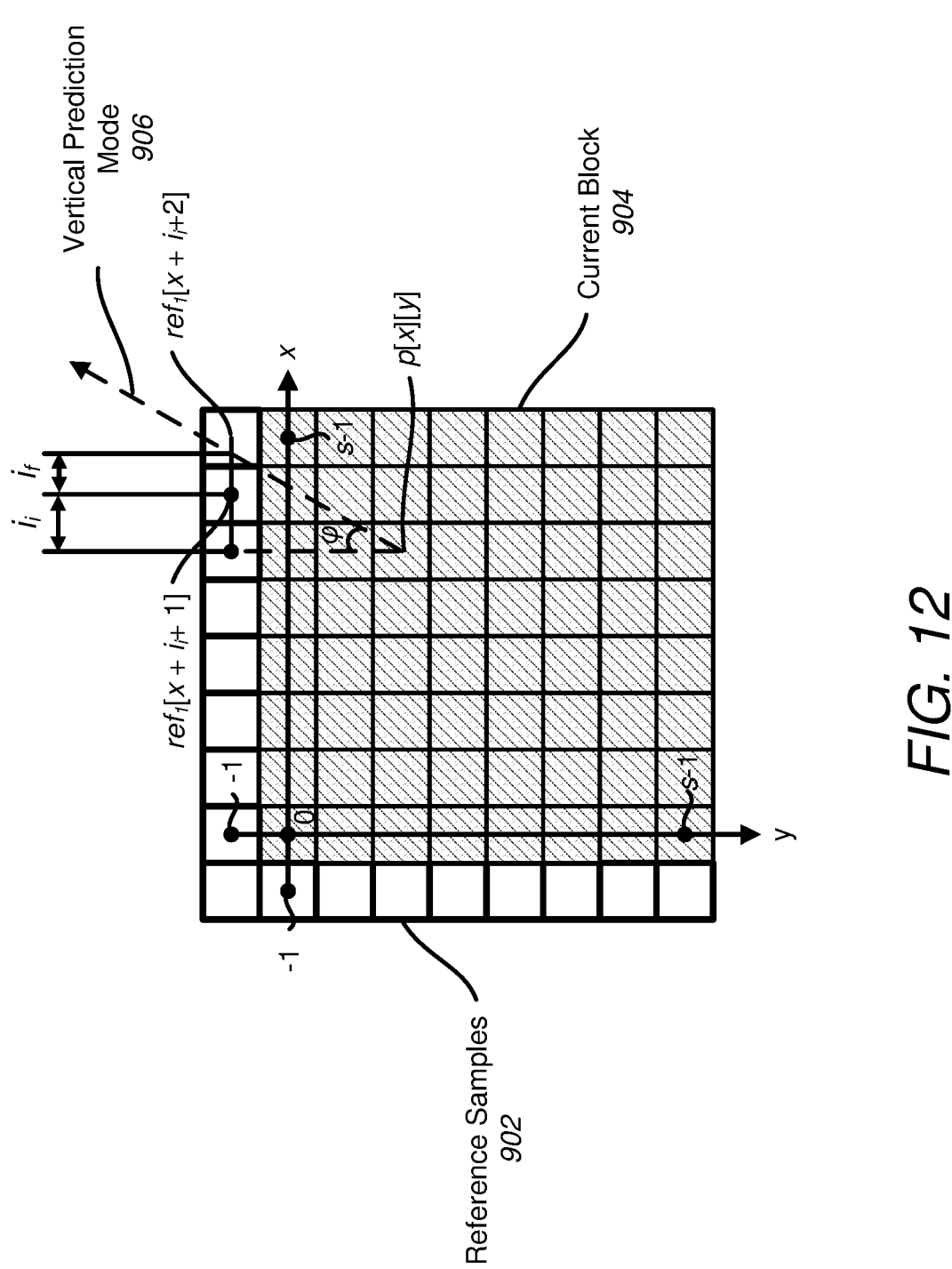
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane, where a sample may be referenced as p[x][y]. In order to simplify the prediction process, reference samples 902 may be placed in two, one-dimensional arrays. Reference samples 902 above current block 904 may be placed in the one-dimensional array $ref_1[x]$:

$$ref_1[x]=p[-1+x][-1], \ (x \geq 0) \tag{1}$$

Reference samples 902 to the left of current block 904 may be placed in the one-dimensional array $ref_2[x]$:

$$ref_2[y]=p[-1][-1+y], \ (y \geq 0) \tag{2}$$

For planar mode, a sample at location [x][y] in current block 904 may be predicted by calculating the mean of two interpolated values. The first of the two interpolated values may be based on a horizontal linear interpolation at location [x][y] in current block 904. The second of the two interpolated values may be based on a vertical linear interpolation at location [x][y] in current block 904. The predicted sample p[x][y] in current block 904 may be calculated as $$p[x][y] = \frac{1}{2 \cdot s}(h[x][y] + v[x][y] + s) \tag{3}$$

where $$h[x][y] = (s - x - 1) \cdot ref_2[y] + (x + 1) \cdot ref_1[s] \tag{4}$$

may be the horizontal linear interpolation at location [x][y] in current block 904 and $$v[x][y]=(s-y-1) \cdot ref_1[x]+(y+1) \cdot ref_2[s] \tag{5}$$

may be the vertical linear interpolation at location [x][y] in current block 904.

For DC mode, a sample at location [x][y] in current block 904 may be predicted by the mean of the reference samples 902. The predicted value sample p[x][y] in current block 904 may be calculated as $$p[x][y] = \frac{1}{2 \cdot s}\left(\sum_{x=0}^{s-1} ref_1[x] + \sum_{y=0}^{s-1} ref_2[y]\right) \tag{6}$$

For angular modes, a sample at location [x][y] in current block 904 may be predicted by projecting the location [x][y] in a direction specified by a given angular mode to a point on the horizontal or vertical line of samples comprising reference samples 902. The sample at location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a prediction of a sample at location [x][y] in current block 904 for a vertical prediction mode 906 given by an angle φ. For vertical prediction modes, the location [x][y] in current block 904 is projected to a point (referred to herein as the "projection point") on the horizontal line of reference samples $ref_1[x]$. Reference samples 902 are only partially shown in FIG. 12 for ease of illustration. Because the projection point falls at a fractional sample position between two reference samples in the example of FIG. 12, the predicted sample p[x][y] in current block 904 may be calculated by linearly interpolating between the two reference samples as follows $$p[x][y]=(1-i_f) \cdot ref_1[x+i_i+1]+i_f \cdot ref_1[x+i_i+2] \tag{7}$$

where $i_i$ is the integer part of the horizontal displacement of the projection point relative to the location [x][y] and may calculated as a function of the tangent of the angle φ of the vertical prediction mode 906 as follows $$i_i = \lfloor (y+1) \cdot \tan \varphi \rfloor, \qquad (8)$$

and $i_f$ is the fractional part of the horizontal displacement of the projection point relative to the location [x][y] and may be calculated as $$i_f = ((y+1) \cdot \tan \varphi) - \lfloor (y+1) \cdot \tan \varphi \rfloor. \qquad (9)$$

where ⌊•⌋ is the integer floor.

For horizontal prediction modes, the position [x][y] of a sample in current block 904 may be projected onto the vertical line of reference samples $ref_2$ [y]. Sample prediction for horizontal prediction modes is given by:

$$p[x][y] = (1-i_f) \cdot ref_2[y+i_i+1] + i_f \cdot ref_2[y+i_i+2] \qquad (10)$$

where $i_i$ is the integer part of the vertical displacement of the projection point relative to the location [x][y] and may be calculated as a function of the tangent of the angle φ of the horizontal prediction mode as follows $$i_i = \lfloor (x+1) \cdot \tan \varphi \rfloor, \qquad (11)$$

and $i_f$ is the fractional part of the vertical displacement of the projection point relative to the location [x][y] and may be calculated as $$i_f = ((x+1) \cdot \tan \varphi) - \lfloor (x+1) \cdot \tan \varphi \rfloor. \qquad (12)$$

where ⌊•⌋ is the integer floor.

The interpolation functions of (7) and (10) may be implemented by an encoder or decoder, such as encoder 200 in FIG. 2 or decoder 300 in FIG. 3, as a set of two-tap finite impulse response (FIR) filters. The coefficients of the two-tap FIR filters may be respectively given by $(1-i_f)$ and $i_f$. In the above angular intra prediction examples, the predicted sample p[x][y] may be calculated with some predefined level of sample accuracy, such as $\frac{1}{32}$ sample accuracy. For $\frac{1}{32}$ sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

It should be noted that supplementary reference samples may be constructed for the case where the position [x][y] of a sample in current block 904 to be predicted is projected to a negative x coordinate, which happens with negative vertical prediction angles φ. The supplementary reference samples may be constructed by projecting the reference samples in $ref_2$ [y] in the vertical line of reference samples 902 to the horizontal line of reference samples 902 using the negative vertical prediction angle φ. Supplemental reference samples may be similarly for the case where the position [x][y] of a sample in current block 904 to be predicted is projected to a negative y coordinate, which happens with negative horizontal prediction angles φ. The supplementary reference samples may be constructed by projecting the reference samples in $ref_1$[x] on the horizontal line of reference samples 902 to the vertical line of reference samples 902 using the negative horizontal prediction angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error to a decoder for decoding of the current block.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

As explained above, intra prediction may exploit correlations between spatially neighboring samples in the same picture of a video sequence to perform video compression. Inter prediction is another coding tool that may be used to exploit correlations in the time domain between blocks of samples in different pictures of the video sequence to perform video compression. In general, an object may be seen across multiple pictures of a video sequence. The object may move (e.g., by some translation and/or affine motion) or remain stationary across the multiple pictures. A current block of samples in a current picture being encoded may therefore have a corresponding block of samples in a previously decoded picture that accurately predicts the current block of samples. The corresponding block of samples may be displaced from the current block of samples due to movement of an object, represented in both blocks, across the respective pictures of the blocks. The previously decoded picture may be referred to as a reference picture and the corresponding block of samples in the reference picture may be referred to as a reference block or motion compensated prediction. An encoder may use a block matching technique to estimate the displacement (or motion) and determine the reference block in the reference picture.

Similar to intra prediction, once a prediction for a current block is determined and/or generated using inter prediction, an encoder may determine a difference between the current block and the prediction. The difference may be referred to as a prediction error or residual. The encoder may then store and/or signal in a bitstream the prediction error and other related prediction information for decoding or other forms of consumption. A decoder may decode the current block by predicting the samples of the current block using the prediction information and combining the predicted samples with the prediction error.

Figure 13A:
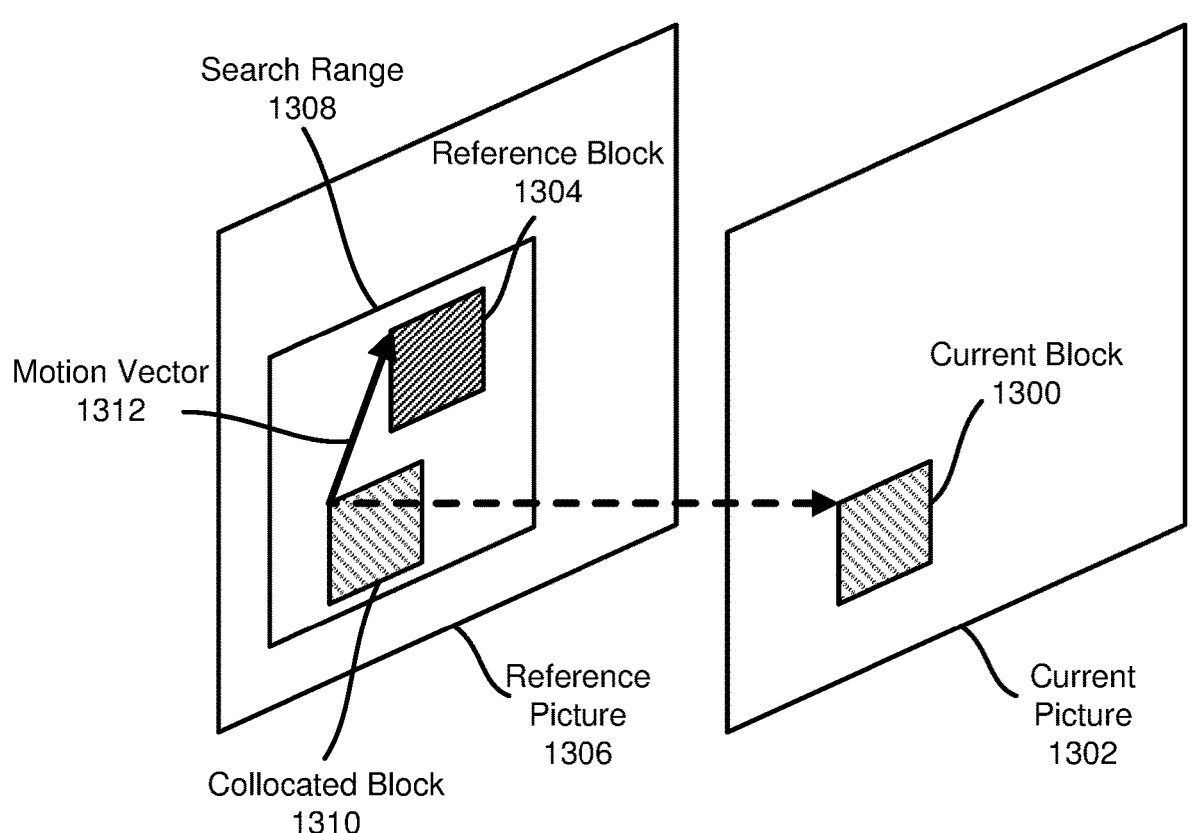
FIG. 13A illustrates an example of inter prediction performed for a current block in a current picture being encoded in accordance with embodiments of the present disclosure.

FIG. 13A illustrates an example of inter prediction performed for a current block 1300 in a current picture 1302 being encoded. An encoder, such as encoder 200 in FIG. 2, may perform inter prediction to determine and/or generate a reference block 1304 in a reference picture 1306 to predict current block 1300. Reference pictures, like reference picture 1306, are prior decoded pictures available at the encoder and decoder. Availability of a prior decoded picture may depend on whether the prior decoded picture is available in a decoded picture buffer at the time current block 1300 is being encoded or decoded. The encoder may, for example, search one or more reference pictures for a reference block that is similar to current block 1300. The encoder may determine a "best matching" reference block from the blocks tested during the searching process as reference block 1304. The encoder may determine that reference block 1304 is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), or sum of absolute transformed differences (SATD)) between the prediction samples of reference block 1304 and the original samples of current block 1300.

The encoder may search for reference block 1304 within a search range 1308. Search range 1308 may be positioned around the collocated position (or block) 1310 of current block 1300 in reference picture 1306. In some instances, search range 1308 may at least partially extend outside of reference picture 1306. When extending outside of reference picture 1306, constant boundary extension may be used such that the values of the samples in the row or column of reference picture 1306, immediately adjacent to the portion of search range 1308 extending outside of reference picture 1306, are used for the "sample" locations outside of reference picture 1306. All or a subset of potential positions within search range 1308 may be searched for reference block 1304. The encoder may utilize any one of a number of different search implementations to determine and/or generate reference block 1304. For example, the encoder may determine a set of a candidate search positions based on motion information of neighboring blocks to current block 1300.

One or more reference pictures may be searched by the encoder during inter prediction to determine and/or generate the best matching reference block. The reference pictures searched by the encoder may be included in one or more reference picture lists. For example, in HEVC and VVC, two reference picture lists may be used, a reference picture list 0 and a reference picture list 1. A reference picture list may include one or more pictures. Reference picture 1306 of reference block 1304 may be indicated by a reference index pointing into a reference picture list comprising reference picture 1306.

Figure 13B:
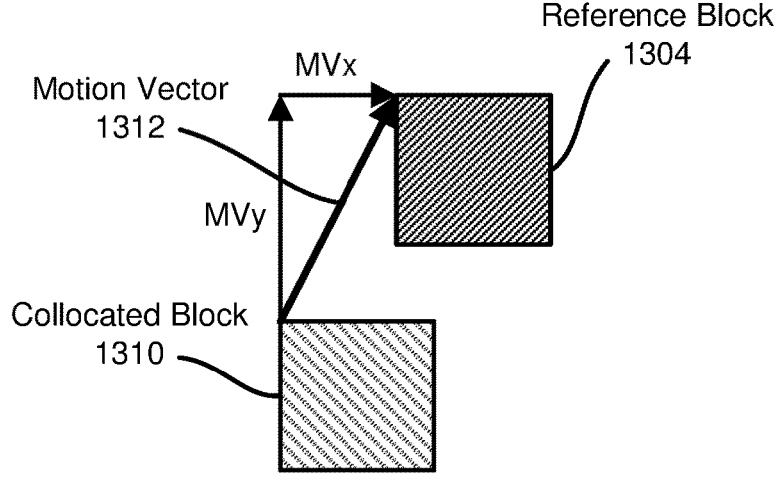
FIG. 13B illustrates an example horizontal component and vertical component of a motion vector in accordance with embodiments of the present disclosure.

The displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component ($MV_x$) and a vertical component ($MV_y$) relative to the position of current block 1300. FIG. 13B illustrates the horizontal component and vertical component of motion vector 1312. A motion vector, such as motion vector 1312, may have fractional or integer resolution. A motion vector with fractional resolution may point between two samples in a reference picture to provide a better estimation of the motion of current block 1300. For example, a motion vector may have ½, ¼, ⅛, 1/16, or 1/32 fractional sample resolution. When a motion vector points to a non-integer sample value in the reference picture, interpolation between samples at integer positions may be used to generate the reference block and its corresponding samples at fractional positions. The interpolation may be performed by a filter with two or more taps.

Once reference block 1304 is determined and/or generated for current block 1300 using inter prediction, the encoder may determine a difference (e.g., a corresponding sample-by-sample difference) between reference block 1304 and current block 1300. The difference may be referred to as a prediction error or residual. The encoder may then store and/or signal in a bitstream the prediction error and the related motion information for decoding or other forms of consumption. The motion information may include motion vector 1312 and a reference index pointing into a reference picture list comprising reference picture 1306. In other instances, the motion information may include an indication of motion vector 1312 and an indication of the reference index pointing into the reference picture list comprising reference picture 1306. A decoder may decode current block 1300 by determining and/or generating reference block 1304, which forms the prediction of current block 1300, using the motion information and combining the prediction with the prediction error.

Figure 14:
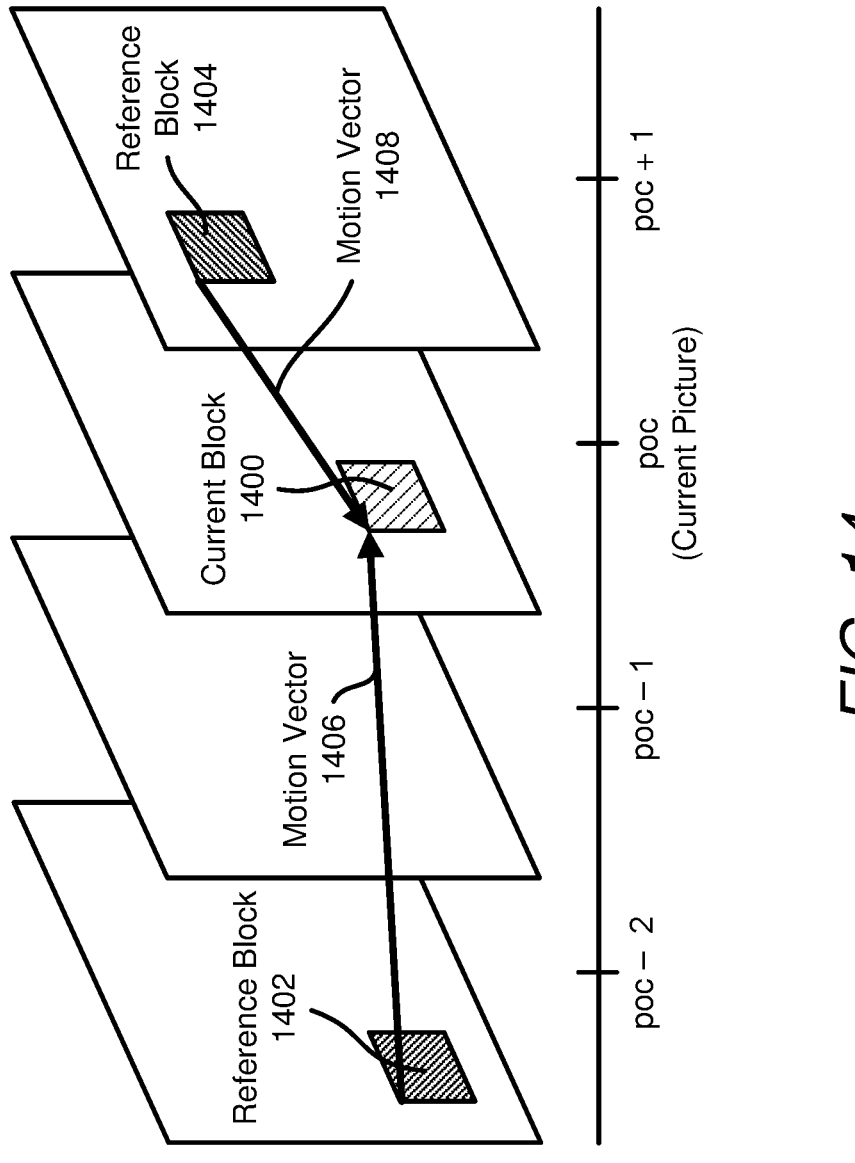
FIG. 14 illustrates an example of bi-prediction, performed for a current block in accordance with embodiments of the present disclosure.

In FIG. 13A, inter prediction is performed using one reference picture 1306 as the source of the prediction for current block 1300. Because the prediction for current block 1300 comes from a single picture, this type of inter prediction is referred to as uni-prediction. FIG. 14 illustrates another type of inter prediction, referred to as bi-prediction, performed for a current block 1400. In bi-prediction, the source of the prediction for a current block 1400 comes from two pictures. Bi-prediction may be useful, for example, where the video sequence comprises fast motion, camera panning or zooming, or scene changes. Bi-prediction may also be useful to capture fade outs of one scene or fade outs from one scene to another, where two pictures are effectively displayed simultaneously with different levels of intensity.

Whether uni-prediction or both uni-prediction and bi-prediction are available for performing inter prediction may depend on a slice type of current block 1400. For P slices, only uni-prediction may be available for performing inter prediction. For B slices, either uni-prediction or bi-prediction may be used. When uni-prediction is performed, an encoder may determine and/or generate a reference block for predicting current block 1400 from reference picture list 0. When bi-prediction is performed, an encoder may determine and/or generate a first reference block for predicting current block 1400 from reference picture list 0 and determine and/or generate a second reference block for predicting current block 1400 from reference picture list 1.

In FIG. 14, inter-prediction is performed using bi-prediction, where two reference blocks 1402 and 1404 are used to predict current block 1400. Reference block 1402 may be in a reference picture of one of reference picture list 0 or 1, and reference block 1404 may be in a reference picture of the other one of reference picture list 0 or 1. As shown in FIG. 14, reference block 1402 is in a picture that precedes the current picture of current block 1400 in terms of picture order count (POC), and reference block 1402 is in a picture that proceeds the current picture of current block 1400 in terms of POC. In other examples, the reference pictures may both precede or proceed the current picture in terms of POC. POC is the order in which pictures are output from, for example, a decoded picture buffer and is the order in which pictures are generally intended to be displayed. However, it should be noted that pictures that are output are not necessarily displayed but may undergo different processing or consumption, such as transcoding. In other examples, the two reference blocks determined and/or generated using bi-prediction may come from the same reference picture. In such an instance, the reference picture may be included in both reference picture list 0 and reference picture list 1.

A configurable weight and offset value may be applied to the one or more inter prediction reference blocks. An encoder may enable the use of weighted prediction using a flag in a picture parameter set (PPS) and signal the weighting and offset parameters in the slice segment header for the current block. Different weight and offset parameters may be signaled for luma and chroma components.

Once reference blocks 1402 and 1404 are determined and/or generated for current block 1400 using inter prediction, the encoder may determine a difference between current block 1400 and each of reference blocks 1402 and 1404. The differences may be referred to as prediction errors or residuals. The encoder may then store and/or signal in a bitstream the prediction errors and their respective related motion information for decoding or other forms of consumption. The motion information for reference block 1402 may include motion vector 1406 and the reference index pointing into the reference picture list comprising the reference picture of reference block 1402. In other instances, the motion information for reference block 1402 may include an indication of motion vector 1406 and an indication of the reference index pointing into the reference picture list comprising the reference picture of reference block 1402. The motion information for reference block 1404 may include motion vector 1408 and the reference index pointing into the reference picture list comprising the reference picture of reference block 1404. In other instances, the motion information for reference block 1404 may include an indication of motion vector 1408 and an indication of the reference index pointing into the reference picture list comprising the reference picture of reference block 1404. A decoder may decode current block 1400 by determining and/or generating reference blocks 1402 and 1404, which together form the prediction of current block 1400, using their respective motion information and combining the predictions with the prediction errors.

In HEVC, VVC, and other video compression schemes, motion information may be predictively coded before being stored or signaled in a bit stream. The motion information for a current block may be predictively coded based on the motion information of neighboring blocks of the current block. In general, the motion information of the neighboring blocks is often correlated with the motion information of the current block because the motion of an object represented in the current block is often the same or similar to the motion of objects in the neighboring blocks. Two of the motion information prediction techniques in HEVC and VVC include advanced motion vector prediction (AMVP) and inter prediction block merging.

An encoder, such as encoder 200 in FIG. 2, may code a motion vector using the AMVP tool as a difference between the motion vector of a current block being coded and a motion vector predictor (MVP). An encoder may select the MVP from a list of candidate MVPs. The candidate MVPs may come from previously decoded motion vectors of neighboring blocks in the current picture of the current block or blocks at or near the collocated position of the current block in other reference pictures. Both the encoder and decoder may generate or determine the list of candidate MVPs.

After the encoder selects an MVP from the list of candidate MVPs, the encoder may signal, in a bitstream, an indication of the selected MVP and a motion vector difference (MVD). The encoder may indicate the selected MVP in the bitstream by an index pointing into the list of candidate MVPs. The MVD may be calculated based on the difference between the motion vector of the current block and the selected MVP. For example, for a motion vector represented by a horizontal component ($MV_x$) and a vertical displacement ($MV_y$) relative to the position of the current block being coded, the MVD may be represented by two components calculated as follows:

$$MVD_x = MV_x - MVP_x \tag{13}$$

$$MVD_y = MV_y - MVP_y \tag{14}$$

where $MVD_x$ and $MVD_y$ respectively represent the horizontal and vertical components of the MVD, and $MVP_x$ and $MVP_y$ respectively represent the horizontal and vertical components of the MVP. A decoder, such as decoder 300 in FIG. 3, may decode the motion vector by adding the MVD to the MVP indicated in the bitstream. The decoder may then decode the current block by determining and/or generating the reference block, which forms the prediction of the current block, using the decoded motion vector and combining the prediction with the prediction error.

Figure 15A:
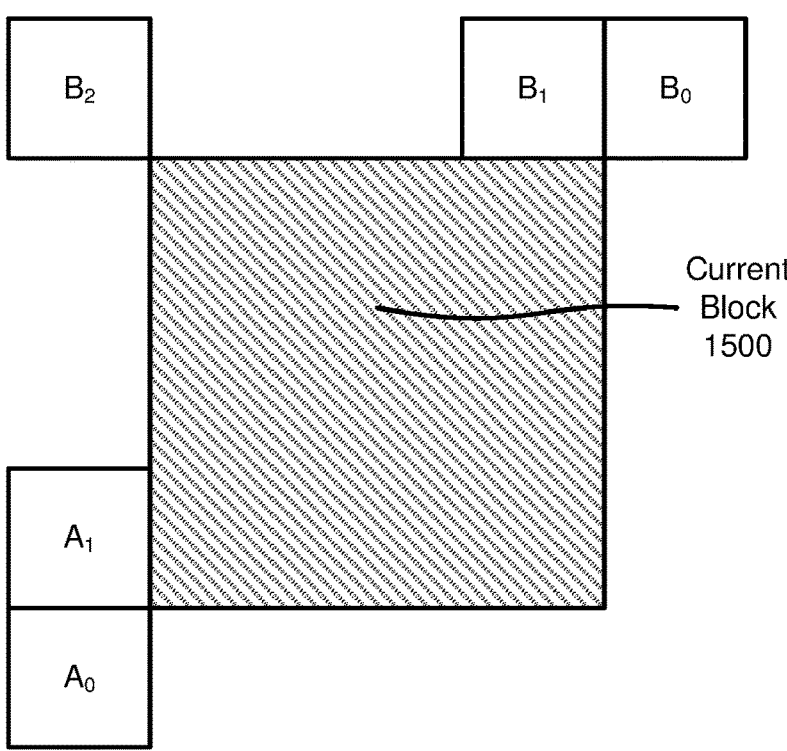
FIG. 15A illustrates an example location of five spatial candidate neighboring blocks relative to a current block being coded in accordance with embodiments of the present disclosure.
Figure 15B:
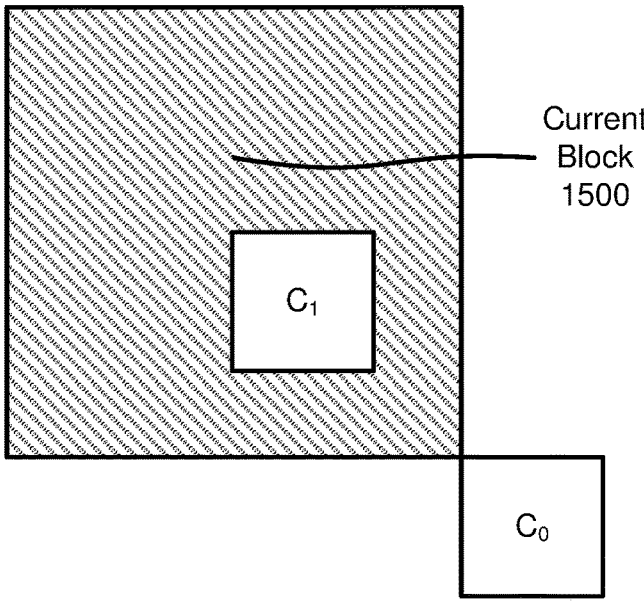
FIG. 15B illustrates an example location of two temporal, co-located blocks relative to a current block being coded in accordance with embodiments of the present disclosure.

In HEVC and VVC, the list of candidate MVPs for AMVP may comprise two candidates referred to as candidates A and B. Candidates A and B may include up to two spatial candidate MVPs derived from five spatial neighboring blocks of the current block being coded, one temporal candidate MVP derived from two temporal, co-located blocks when both spatial candidate MVPs are not available or are identical, or zero motion vectors when the spatial, temporal, or both candidates are not available. FIG. 15A illustrates the location of the five spatial candidate neighboring blocks relative to a current block 1500 being encoded. The five spatial candidate neighboring blocks are respectively denoted $A_0$, $A_1$, $B_0$, $B_1$, and $B_2$. FIG. 15B illustrates the location of the two temporal, co-located blocks relative to current block 1500 being coded. The two temporal, co-located blocks are denoted $C_0$ and $C_1$ and are included in a reference picture that is different from the current picture of current block 1500.

An encoder, such as encoder 200 in FIG. 2, may code a motion vector using the inter prediction block merging tool also referred to as merge mode. Using merge mode, the encoder may reuse the same motion information of a neighboring block for inter prediction of a current block. Because the same motion information of a neighboring block is used, no MVD needs to be signaled and the signaling overhead for signaling the motion information of the current block may be small in size. Similar to AMVP, both the encoder and decoder may generate a candidate list of motion information from neighboring blocks of the current block. The encoder may then determine to use (or inherit) the motion information of one neighboring block's motion information in the candidate list for predicting the motion information of the current block being coded. The encoder may signal, in the bit stream, an indication of the determined motion information from the candidate list. For example, the encoder may signal an index pointing into the list of candidate motion information to indicate the determined motion information.

In HEVC and VVC, the list of candidate motion information for merge mode may comprise up to four spatial merge candidates that are derived from the five spatial neighboring blocks used in AMVP as shown in FIG. 15A, one temporal merge candidate derived from two temporal, co-located blocks used in AMVP as shown in FIG. 15B, and additional merge candidates including bi-predictive candidates and zero motion vector candidates.

It should be noted that inter prediction may be performed in other ways and variants than those described above. For example, motion information prediction techniques other than AMVP and merge mode are possible. In addition, although the description above was primarily made with respect to inter prediction modes in HEVC and VVC, it will be understood that the techniques of the present disclosure described above and further below may be applied to other inter prediction modes, including those of other video coding standards like VP8, VP9, AV1, and the like. In addition, history based motion vector prediction (HMVP), combined intralinter prediction mode (CIIP), and merge mode with motion vector difference (MMVD) as described in VVC may also be performed and are within the scope of the present disclosure.

In inter prediction, a block matching technique may be applied to determine a reference block in a different picture than the current block being encoded. Block matching techniques have also been applied to determine a reference block in the same picture as a current block being encoded. However, it has been determined that for camera-captured videos, a reference block in the same picture as the current block determined using block matching may often not accurately predict the current block. For screen content video this is generally not the case. Screen content video may include, for example, computer generated text, graphics, and animation. Within screen content, there is often repeated patterns (e.g., repeated patterns of text and graphics) within the same picture. Therefore, a block matching technique applied to determine a reference block in the same picture as a current block being encoded may provide efficient compression for screen content video.

HEVC and VVC both include a prediction technique to exploit the correlation between blocks of samples within the same picture of screen content video. This technique is referred to as intra block (IBC) or current picture referencing (CPR). Similar to inter prediction, an encoder may apply a block matching technique to determine a displacement vector (referred to as a block vector (BV)) that indicates the relative displacement from the current block to a reference block (or intra block compensated prediction) that "best matches" the current block. The encoder may determine the best matching reference block from blocks tested during a searching process similar to inter prediction. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. A reference block may correspond to prior decoded blocks of samples of the current picture. The reference block may comprise decoded blocks of samples of the current picture prior to being processed by in-loop filtering operations, like deblocking or SAO filtering. FIG. 16 illustrates an example of IBC applied for screen content. The rectangular portions with arrows beginning at their boundaries are current blocks being encoded and the rectangular portions that the arrows point to are the reference blocks for predicting the current blocks.

Once a reference block is determined and/or generated for a current block using IBC, the encoder may determine a difference (e.g., a corresponding sample-by-sample difference) between the reference block and the current block. The difference may be referred to as a prediction error or residual. The encoder may then store and/or signal in a bitstream the prediction error and the related prediction information for decoding or other forms of consumption. The prediction information may include a BV. In other instances, the prediction information may include an indication of the BV. A decoder, such as decoder 300 in FIG. 3, may decode the current block by determining and/or generating the reference block, which forms the prediction of the current block, using the prediction information and combining the prediction with the prediction error.

In HEVC, VVC, and other video compression schemes, a BV may be predictively coded before being stored or signaled in a bit stream. The BV for a current block may be predictively coded based on the BV of neighboring blocks of the current block. For example, an encoder may predictively code a BV using the merge mode as explained above for inter prediction or a similar technique as AMVP also explained above for inter prediction. The technique similar to AMVP may be referred to as BV prediction and difference coding.

For BV prediction and difference coding, an encoder, such as encoder 200 in FIG. 2, may code a BV as a difference between the BV of a current block being coded and a BV predictor (BVP). An encoder may select the BVP from a list of candidate BVPs. The candidate BVPs may come from previously decoded BVs of neighboring blocks of the current block in the current picture. Both the encoder and decoder may generate or determine the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \tag{15}$$

$$BVD_y = BV_y - BVP_y \tag{16}$$

where $BVD_x$ and $BVD_y$ respectively represent the horizontal and vertical components of the BVD, and $BVP_x$ and $BVP_y$ respectively represent the horizontal and vertical components of the BVP. A decoder, such as decoder 300 in FIG. 3, may decode the BV by adding the BVD to the BVP indicated in the bitstream. The decoder may then decode the current block by determining and/or generating the reference block, which forms the prediction of the current block, using the decoded BV and combining the prediction with the prediction error.

In HEVC and VVC, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC are the same as those shown in FIG. 15A for inter prediction. The five spatial candidate neighboring blocks are respectively denoted $A_0$, $A_1$, $B_0$, $B_1$, and $B_2$.

As explained above with respect to FIG. 12, two-tap interpolation filters may be used to determine a predicted sample for angular intra prediction. Four-tap interpolation filters may also be used to determine a predicted sample for angular intra prediction. For example, the location of a sample in a current block may be projected in a direction specified by an angular prediction mode to a point (referred to herein as a "projection point") between two reference samples on a reference sample line. The sample may be predicted by applying a four-tap interpolation filter to the two closest reference samples on each side of the projection point. As compared to two-tap interpolation filters, four-tap interpolation filters may be used to provide additional reference sample smoothing. Smoothing is equivalent to low pass filtering and may be employed to attenuate high frequency spatial content in the reference samples. The smoothing may help to reduce contouring artifacts in predicted samples of a block caused by steps in the values of the reference samples.

In VVC, a set of two-tap interpolation filters is used to determine predicted values for chroma samples, and two different sets of four-tap interpolation filters are used to determine predicted values for luma samples. The two different sets of four-tap interpolation filters include a set of DCT-based interpolation filters (DCTIFs) and a set of so called smoothing interpolation filters (SIFs). The SIF filter kernels are obtained by convolving the kernel of a two-tap interpolation filter with a kernel of a three-tap [1, 2, 1]/4 smoothing filter.

In general, the set of SIF filters provide more smoothing of the reference samples than the set of DCTIF filters. The selection of which of these two types of filters is used to determine a prediction of a sample depends on a size of the block of the sample and an applied intra prediction mode. More specifically, SIF is selected based on an applied intra prediction mode index being outside a threshold range of both the exactly horizontal and vertical intra prediction mode indexes. If the applied intra prediction mode index is not outside the threshold range of both the exactly horizontal and vertical intra prediction mode indexes, DCTIF is selected. The threshold range is determined based on a size of the block of the sample. It should be noted that SIF and DCTIF are further only selected for fractional slope intra prediction modes. Exactly horizontal, exactly vertical, and integer slope intra prediction modes do not result in a location of a sample being projected between reference samples and therefore neither SIF nor DCTIF is used to perform interpolation.

Figure 17:
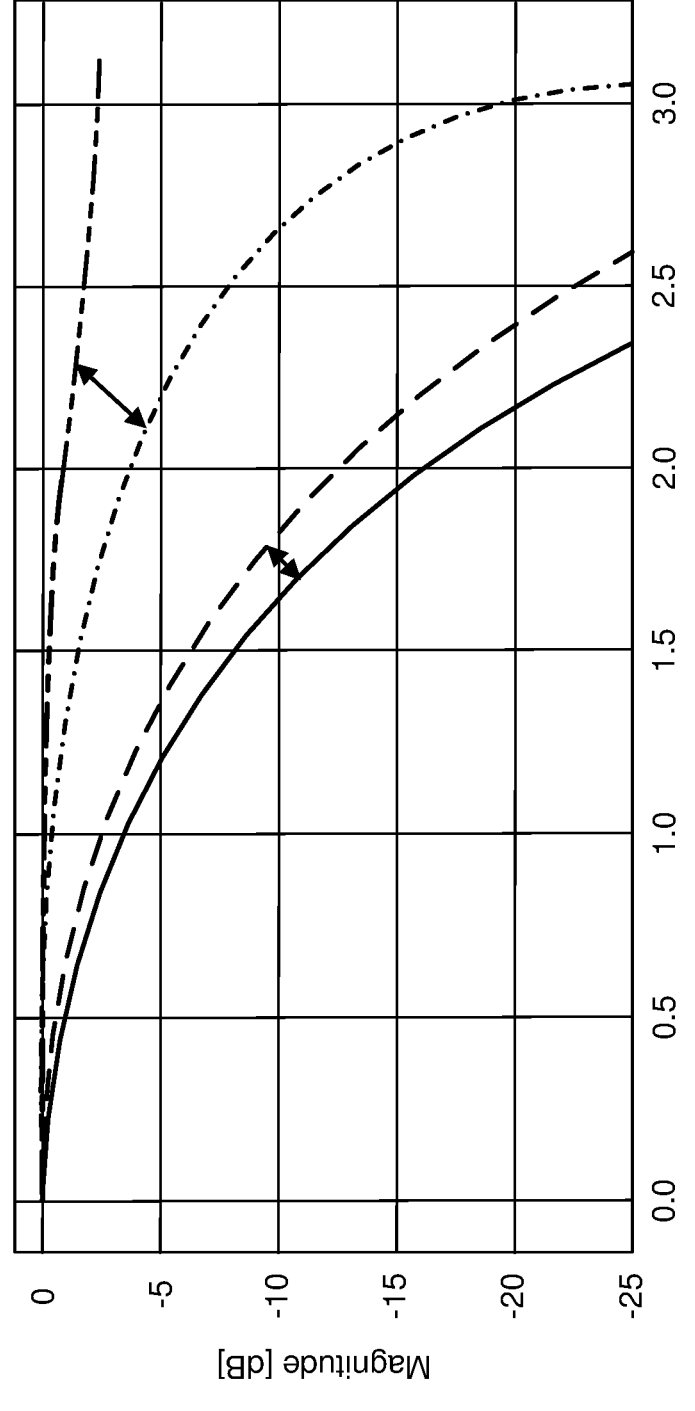
FIG. 17 illustrates an example magnitude of the frequency response for both a smoothing interpolation filter (SIF) and discrete cosine transform (DCT) interpolation filter (DCTIF) at two different fractional sample positions of a projection point in accordance with embodiments of the present disclosure.

In existing technologies like VVC, the amount of reference sample smoothing provided by interpolation filters like SIF and DCTIF is generally invariant to the fractional sample position of a projection point between two reference samples. This invariance to the fractional sample position of a projection point is illustrated in FIG. 17. FIG. 17 illustrates an example magnitude of the frequency response for both SIF and DCTIF at two different fractional sample positions of a projection point. The fractional sample positions are $^{16}/_{32}$ (or $1/2$) samples and $^{4}/_{32}$ (or $1/8$) samples. Despite a relatively large difference in the two fractional sample positions, the magnitude of the frequency response of the two filters only changes slightly. This may not be ideal because more or less smoothing may be needed at certain fractional sample positions of a projection point. If too much or too little smoothing is provided, the predicted value provided by the interpolation filter may not accurately predict a sample, resulting in an increase in residual energy and, ultimately, more bits required to send the residual in a bitstream.

Embodiments of the present disclosure may project a location of a sample to a point on a reference sample line between a plurality of reference samples. A filter may be applied to the plurality of reference samples to smooth the plurality of reference samples. The amount of smoothing provided by the filter may be determined based on a distance of the projection point to a closest integer sample position on the reference line. The smoothing strength of the filter may be adapted in this manner to provide a better prediction of the sample. For example, each of the coefficients of the filter may be determined in inverse relation to the distance of the projection point to a closest integer sample position on the reference sample line. The coefficients of the filter may then be applied to the plurality of reference samples to determine a filtered value, which may be used as a basis for a predicted sample. These and other features of the present disclosure are described further below.

Figure 18:
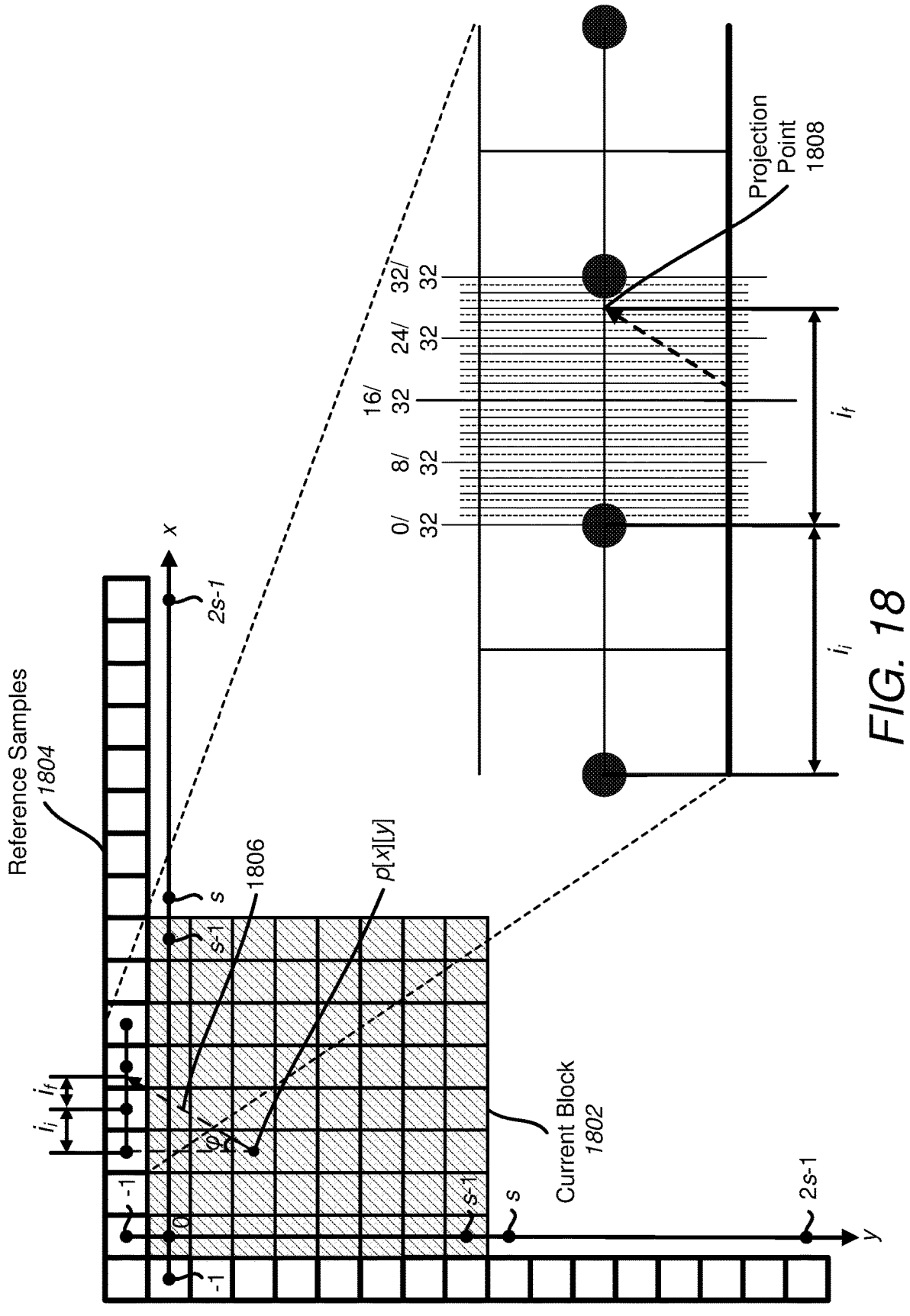
FIG. 18 illustrates an example intra prediction performed for a current block in accordance with embodiments of the present disclosure.

FIG. 18 illustrates an example intra prediction performed for a current block 1802 in accordance with embodiments of the present disclosure. The intra prediction of FIG. 18 may be performed by an encoder, such as encoder 200 in FIG. 2. The encoder may determine reference samples 1804 for intra prediction of current block 1802. Given current block 1802 is of w×h samples in size, reference samples 1804 may extend over 2w samples of the row immediately adjacent to the top-most row of current block 1802, 2$h$ samples of the column immediately adjacent to the left-most column of current block 1802, and the top left neighboring corner sample to current block 1802. In FIG. 18, current block 1802 is square, so w=h=s. For constructing the set of reference samples 1804, the encoder may use available samples from neighboring blocks of current block 1802 and may fill unavailable ones of reference samples 1804 using one or more different techniques.

After the encoder determines reference samples 1804, samples of current block 1802 may be intra predicted based on reference samples 1804. For example, the encoder may predict the samples of current block 1802 for each of the 35 intra prediction modes in HEVC or 67 intra prediction modes in VVC. For each intra prediction mode applied, the encoder may determine a prediction error for current block 1802 based on a difference (e.g., sum of squared differences (SSD), sum of absolute differences (SAD), or sum of absolute transformed differences (SATD)) between the predicted samples determined for the intra prediction mode and the original samples of current block 1802. The encoder may select an intra prediction mode to encode current block 1802 based on the determined prediction errors. For example, the encoder may select an intra prediction mode that results in the smallest prediction error for current block 1802. In another example, the encoder may select the intra prediction mode to encode current block 1802 based on a rate-distortion measure determined using the prediction errors. The encoder may send an indication of a selected intra prediction mode and its corresponding prediction error to a decoder for decoding of current block 1802.

For angular intra prediction modes, the encoder may predict a sample in current block 1802 by projecting the location of the sample in a direction specified by a given angular mode to a point (referred to herein as a "projection point") on the horizontal or vertical line of reference samples 1804. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC). If the projection point falls at a fractional sample position between two reference samples, the encoder may apply an interpolation filter to one or more of the reference samples available at integer sample positions on each side of the projection point. The interpolation filter may filter the reference samples to interpolate a value at the fractional sample position of the projection point. The encoder may determine the predicted sample value based on the interpolated value.

For example, the encoder may predict a sample at location [x][y] in current block 1802 by projecting the location [x][y] in a direction 1806 specified by a vertical prediction mode. Direction 1806 may be given by an angle φ defined relative to the y-axis for the vertical prediction mode. The location [x][y] may be projected to a projection point 1808 on the horizontal line of reference samples 1804. As shown in FIG. 18, projection point 1808 falls at a fractional sample position between two reference samples on the horizontal line of reference samples 1804. Projection point 1808 is defined by a displacement in the horizontal direction relative to the location [x][y] by an integer amount $i_i$ equal to one sample and a fractional amount $i_f$ equal to 24/32 samples, where $i_i$ and $i_f$ may respectively be given by (11) and (12) above. Because projection point 1808 falls at a fractional sample position, the encoder may apply an interpolation filter to one or more of the reference samples available at integer sample positions on each side of projection point 1808. The interpolation filter may filter the reference samples to interpolate a value at the fractional sample position of projection point 1808. The encoder may determine the predicted sample p[x][y] based on the interpolated value.

Figure 19:
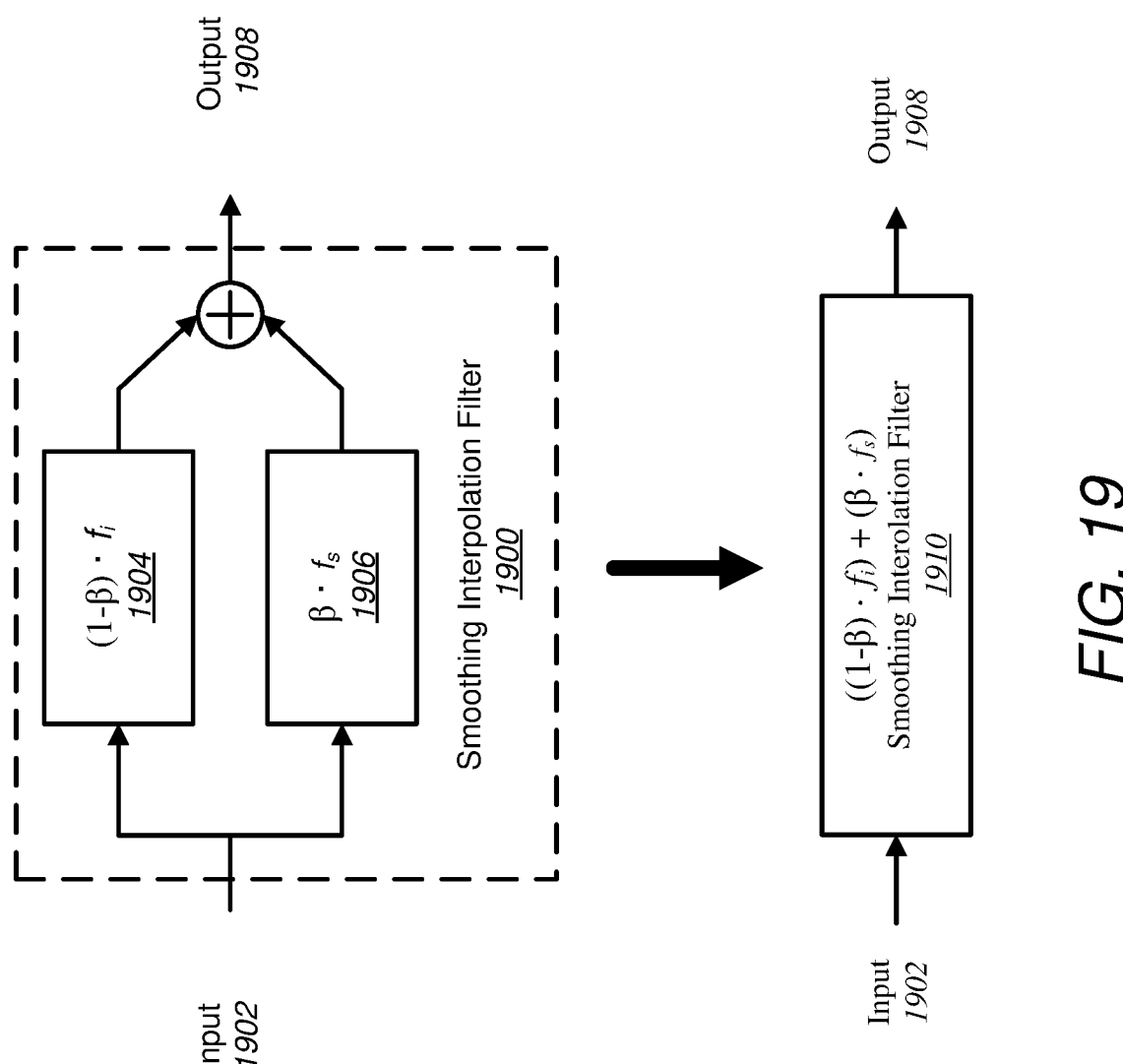
FIG. 19 illustrates an example smoothing interpolation filter in accordance with embodiments of the present disclosure.

FIG. 19 illustrates an example smoothing interpolation filter 1900 in accordance with embodiments of the present disclosure. Smoothing interpolation filter 1900 may be used to filter two or more reference samples on each side of projection point 1808 in FIG. 18 to interpolate a value at the fractional sample position of projection point 1808. The predicted sample p[x][y] in current block 1802 of FIG. 18 may be determined based on the interpolated value.

Smoothing interpolation filter 1900 receives, at input 1902, the two or more reference samples on each side of projection point 1808. For example, smoothing interpolation filter 1900 may receive, at input 1902, the two closest reference samples on each side of projection point 1808. Smoothing interpolation filter 1900 may filter the reference samples received at input 1902 using an interpolation filter 1904 and a smoothing filter 1906. As shown in FIG. 19, interpolation filter 1904 and smoothing filter 1906 are coupled in parallel and may each receive the reference samples from input 1902.

Interpolation filter 1904 may be implemented as an FIR filter. The output of interpolation filter 1904 may be given by $$p_i[x][y] = \sum_{n=0}^{m} f_i[n] \cdot \text{ref}_1[x + i_i + n] \tag{17}$$

where m is the number of reference samples to be filtered, $f_i[n]$ are the coefficients (or taps) of interpolation filter 1904, $\text{ref}_1[x]$ is the horizontal line of reference samples 1804 in FIG. 18 in array form, and $i_i$ is the integer sample displacement of projection point 1808 from the sample location [x][y] in the horizontal direction. The coefficients (or taps) of interpolation filter 1904 may be determined to interpolate a value at the fractional sample position of projection point 1808 based on the reference samples received at input 1902.

Smoothing filter 1906 may be implemented as an FIR filter. The output of smoothing filter 1906 may be given by $$p_s[x][y] = \sum_{n=0}^{m} f_s[n] \cdot \text{ref}_1[x + i_i + n] \tag{18}$$

where m is the number of reference samples to be filtered, $f_s[n]$ are the coefficients (or taps) of smoothing filter 1906, $\text{ref}_1[x]$ is the horizontal line of reference samples 1804 in FIG. 18 in array form, and $i_i$ is the integer sample displacement of projection point 1808 from the sample location [x][y] in the horizontal direction. The coefficients (or taps) of smoothing filter 1906 may be determined to have a low pass frequency response to attenuate higher frequency content in the reference samples received at input 1902. The smoothing may help to reduce contouring artifacts in predicted samples of a block caused by steps in the values of the reference samples.

The filtered value $p_i[x][y]$ of interpolation filter 1904 and the filtered value $p_s[x][y]$ of smoothing filter 1906 may be combined and provided at output 1908 of reference sample filter 1900. For example, the filtered value $p_i[x][y]$ of interpolation filter 1904 and the filtered value $p_s[x][y]$ of smoothing filter 1906 may be summed and provided at output 1908. The predicted sample p[x][y] in current block 1802 of FIG. 18 may be determined based on the combined filtered values of $p_i[x][y]$ and $p_s[x][y]$. For example, the predicted sample p[x][y] may be determined as the combined filtered values of $p_i[x][y]$ and $p_s[x][y]$.

As mentioned above, the amount of reference sample smoothing provided by filters like smoothing interpolation filter 1900 are generally invariant to the fractional sample position of a projection point between reference samples. This may not be ideal because, at certain fractional sample positions of a projection point, more or less smoothing may be needed. If too much or too little smoothing is provided, the output of the filter may not accurately predict a sample, resulting in an increase in residual energy and, ultimately, more bits required to send the residual in a bitstream.

To improve prediction accuracy, the amount of smoothing provided by smoothing interpolation filter 1900 may be determined based on a distance of a projection point to a closest integer sample position on the reference line that the projection point falls. The smoothing strength of smoothing interpolation filter 1900 may be adapted in this manner to provide a better prediction of a sample. For example, each coefficient of smoothing filter 1906 may be determined based on a function β that is related to the distance of the projection point from a closest integer sample position on the reference sample line that the projection point falls. The magnitude of the β adjusted coefficients of smoothing filter 1906 may be determined as $\beta \cdot f_s$ as shown in FIG. 19. As β increases, the magnitude of each coefficient of smoothing filter 1906 may be increased accordingly and, as β decreases, the magnitude of each coefficient of smoothing filter 1906 may be decreased accordingly. The output of the β adjusted smoothing filter 1906 may be given as $$p'_s[x][y] = \sum_{n=0}^{m} \beta \cdot f_s[n] \cdot \text{ref}_1[x + i_i + n] \tag{19}$$

where m is the number of reference samples to be filtered, $\beta \cdot f_s[n]$ are the coefficients (or taps) of the β adjusted smoothing filter 1906, $\text{ref}_1[x]$ is the horizontal line of reference samples 1804 in FIG. 18 in array form, and $i_i$ is the integer sample displacement of projection point 1808 from the sample location [x][y] in the horizontal direction.

In one example, β may be inversely related to the distance of a projection point from a closest integer sample position on a reference sample line that the projection point falls. In other words, β decreases as the projection point moves, in either direction along the reference sample line, away from a half sample fractional position between two reference samples toward an integer sample position. Conversely, β increases as the projection point moves, in either direction along the reference sample line, away from an integer sample position toward the half sample fractional position between the two reference samples.

In another example, β may be directly related to the distance of a projection point from a closest integer sample position on a reference sample line that the projection point falls. In other words, β increases as the projection point moves, in either direction along the reference sample line, away from a half sample fractional position between two reference samples toward an integer sample position. Conversely, β decreases as the projection point moves, in either direction along the reference sample line, away from an integer sample position toward the half sample fractional position between the two reference samples.

As further shown in FIG. 19, to maintain a constant, full range output of smoothing interpolation filter 1900 with changes in β, each coefficient of interpolation filter 1904 may be further determined based on the function (1−β), where β ranges from 0 to 1 with some predefined level of sample accuracy, like $\frac{1}{32}$ samples. The output of the β adjusted interpolation filter 1904 may be given by $$p'_{i}[x][y] = \sum_{n=0}^{m}(1-\beta)\cdot f_{i}[n]\cdot\mathrm{ref}_{1}[x+i_{i}+n] \quad (20)$$

where m is the number of reference samples to be filtered, $(1-\beta)\cdot f_{i}[n]$ are the coefficients (or taps) of the β adjusted interpolation filter 1904, $\mathrm{ref}_{1}[x]$ is the horizontal line of reference samples 1804 in FIG. 18 in array form, and $i_{i}$ is the integer sample displacement of projection point 1808 from the sample location [x][y] in the horizontal direction.

FIG. 19 further illustrates that the two stage smoothing interpolation filter 1900 may be reduced to a single stage smoothing interpolation filter 1910. Specifically, the parallel combination of the β adjusted interpolation filter 1904 and the β adjusted smoothing filter 1906 may be reduced to a single stage smoothing interpolation filter 1910 by adding corresponding ones of their respective filter coefficients together. The coefficients of smoothing interpolation filter 1910 may be given by $$f_{SIF}[n]=(1-\beta)\cdot f_{i}[n]+\beta\cdot f_{s}[n], \; n=\{0,\dots m\} \quad (21)$$

The output of the β adjusted single stage smoothing interpolation filter 1910 may be given by $$p'_{sif}[x][y] = \sum_{n=0}^{m}f_{SIF}[n]\cdot\mathrm{ref}_{1}[x+i_{i}+n] \quad (22)$$

Smoothing interpolation filter 1910 may reduce hardware requirements over reference sample filter 1900. For example, because smoothing interpolation filter 1910 uses half the number of filter coefficients as reference sample filter 1900, smoothing interpolation filter 1910 may require fewer arithmetic operations and less memory bandwidth.

It should be noted that, although smoothing interpolation filters 1900 and 1910 were described above as being used to determine a predicted value based on a vertical intra prediction mode, smoothing interpolation filters 1900 and 1910 may also be used for horizontal prediction modes as would be appreciated by a person of ordinary skill in the art based on the teachings herein.

It should be further noted that, although smoothing interpolation filters 1900 and 1910 were described above as being used to determine a predicted value at an encoder, smoothing interpolation filters 1900 and 1910 may also be used at a decoder to determine a predicted value of a sample for angular intra prediction. For example, a decoder may receive an indication of an angular intra prediction mode from an encoder for a block. The decoder may construct a set of reference samples and perform intra prediction based on the angular intra prediction mode indicated by the encoder for the block in a similar manner as discussed above for the encoder. The decoder would add the predicted values of the samples of the block to a residual of the block to reconstruct the block. In another embodiment, the decoder may not receive an indication of an angular intra prediction mode from an encoder for a block. Instead, the decoder may determine an intra prediction mode through other means.

Finally, it should be noted that smoothing interpolation filters 1900 and 1910 may be used to determine a predicted value of a sample for inter prediction. During inter prediction as explained above with respect to FIGS. 13A-B, one or more reference pictures may be searched by an encoder to determine and/or generate a best matching reference block. The displacement between the reference block and the current block may be interpreted as an estimate of the motion between the reference block and the current block across their respective pictures. The displacement may be represented by a motion vector. For example, a motion vector may be indicated by a horizontal component and a vertical component relative to the position of the current block. A motion vector may have fractional or integer resolution. A motion vector with fractional resolution may point between two samples in a reference picture to provide a better estimation of the motion of the current block. For example, a motion vector may have $\frac{1}{2}$, $\frac{1}{4}$, $\frac{1}{8}$, $\frac{1}{16}$, or $\frac{1}{32}$ fractional sample resolution. When a motion vector points to a non-integer sample value in the reference picture, interpolation between samples at integer positions may be used to generate the reference block and its corresponding samples at fractional positions. The interpolation may be performed by smoothing interpolation filter 1900 or 1910. A decoder may receive an indication of the motion vector from an encoder and perform a similar interpolation process to determine predicted samples for a block. The decoder may similarly use smoothing interpolation filter 1900 or 1910 to perform the interpolation.

FIG. 20 illustrates four plots 2002-2008 of example/functions that may be used by smoothing interpolation filters, such as smoothing interpolation filters 1900 and 1910, in accordance with embodiments of the present disclosure. Each plot 2002-2008 illustrates β on the vertical axis and $i_{f}$ on the horizontal axis, where $i_{f}$ is the fractional part of the displacement of the projection point, on a reference line, relative to the location [x][y] of the sample from which the projection point was projected. For example, $i_{f}$ may be given by (12) above. The maximum value of $i_{f}$ may be set by a parameter $\beta$ in each plot 2102-2108, where $\beta$ may range from 0 to 1 with some predefined level of sample accuracy, like $\frac{1}{32}$ samples.

In plot 2002, $\beta$ is inversely related to the distance of the projection point from the closest integer sample position on the reference sample line. In other words, $\beta$ increases as the projection point moves, in either direction along the reference sample line, away from an integer sample position (0/32 or 32/32) toward the half sample fractional position (16/32) between the two reference samples. As further illustrated by plot 2002, the change in $\beta$ is linear as the projection point moves, in either direction along the reference sample line, away from an integer sample position (0/32 or 32/32) toward the half sample fractional position (16/32) between the two reference samples. $\beta$ in plot 2002 may be given by $$\beta = \left(\frac{1}{2} - \left|\frac{1}{2} - i_f\right|\right) \cdot 2\beta_0 \tag{23}$$

In plot 2004, $\beta$ is similarly inversely related to the distance of the projection point from the closest integer sample position on the reference sample line. However, in contrast to plot 2002, the change in $\beta$ is non-linear as the projection point moves, in either direction along the reference sample line, away from an integer sample position (0/32 or 32/32) toward the half sample fractional position (16/32) between the two reference samples. $\beta$ in plot 2004 may be given by a gaussian function or some other non-linear function.

In plot 2006, $\beta$ is directly related to the distance of the projection point from the closest integer sample position on the reference sample line. In other words, $\beta$ decreases as the projection point moves, in either direction along the reference sample line, away from an integer sample position (0/32 or 32/32) toward the half sample fractional position (16/32) between the two reference samples. As further illustrated by plot 2006, the change in $\beta$ is linear as the projection point moves, in either direction along the reference sample line, away from an integer sample position (0/32 or 32/32) toward the half sample fractional position (16/32) between the two reference samples. $\beta$ in plot 2006 may be given by $$\beta = \beta_0 - \left(\left(\frac{1}{2} - \left|\frac{1}{2} - i_f\right|\right) \cdot 2\beta_0\right) \tag{24}$$

In plot 2008, $\beta$ is similarly directly related to the distance of the projection point from the closest integer sample position on the reference sample line. However, in contrast to plot 2006, the change in $\beta$ is non-linear as the projection point moves, in either direction along the reference sample line, away from an integer sample position (0/32 or 32/32) toward the half sample fractional position (16/32) between the two reference samples. $\beta$ in plot 2008 may be given by a horizontally reflected gaussian function or some other non-linear function.

Figure 21:
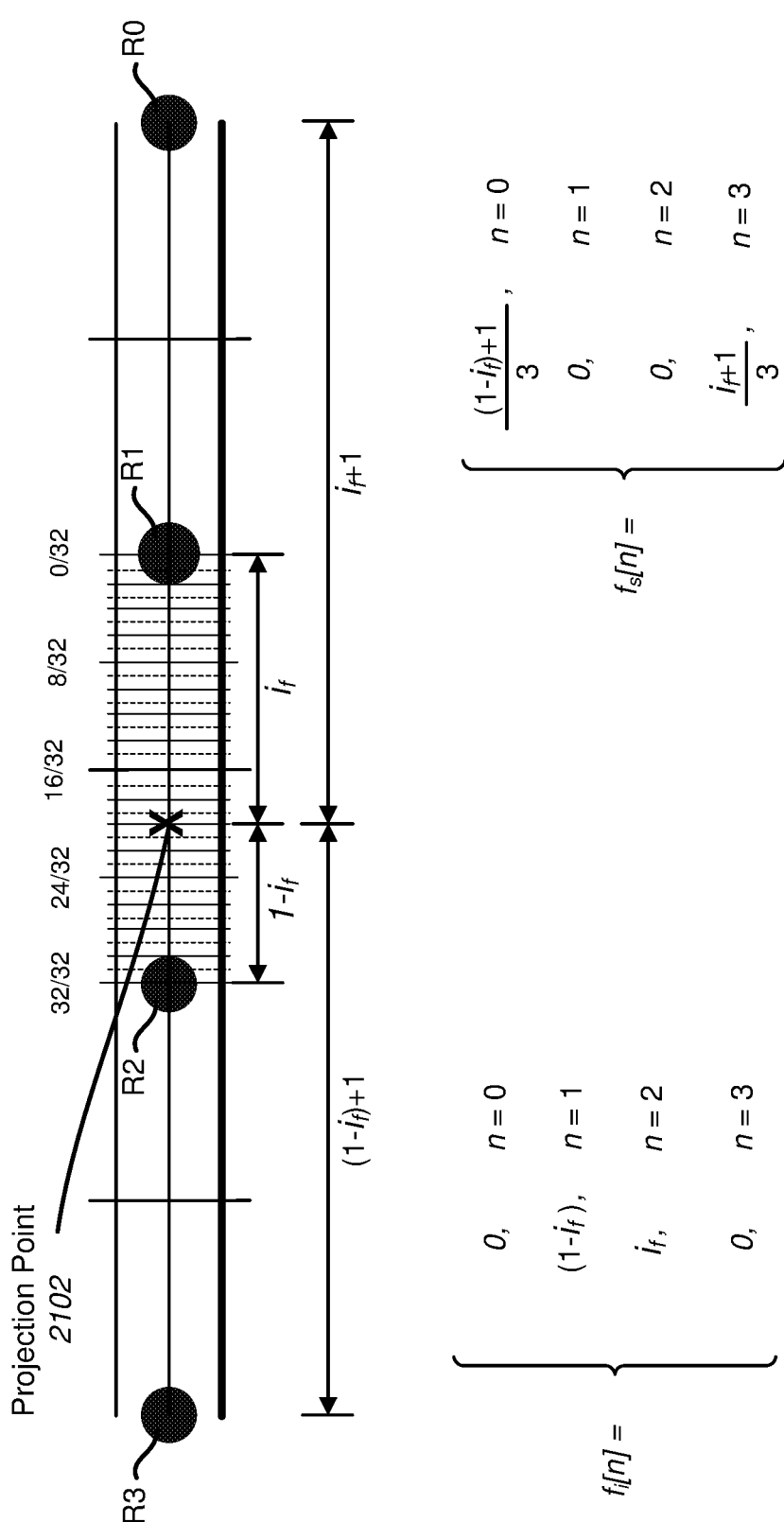
FIG. 21 illustrates example coefficients that may be implemented by the smoothing interpolation filters in FIG. 19 in accordance with embodiments of the present disclosure.

FIG. 21 illustrates example coefficients that may be implemented by smoothing interpolation filters 1900 and 1910 in FIG. 19 in accordance with embodiments of the present disclosure. More specifically, FIG. 21 illustrates example coefficients $f_i[n]$ that may be implemented by $\beta$ adjusted interpolation filter 1904 given by (20), and example coefficients $f[n]$ that may be implemented by $\beta$ adjusted smoothing filter 1906 given by (19). Coefficients $f_i[n]$ and coefficients $f_s[n]$ may be combined as in (21) after being adjusted by $\beta$ to create a single stage $\beta$ adjusted smoothing interpolation filter given by (22).

Coefficients $f_i[n]$ include four coefficients. The first coefficient $f_i[0]$ and the last coefficient $f_i[3]$ are equal to zero and therefore may be disregarded. The second coefficient $f_i[1]$ and the third coefficient $f_i[2]$ are determined to interpolate a value at a projection point by performing a normalized, weighted average of the two closest reference samples on a reference sample line that the projection point falls between. The second coefficient $f_i[1]$ is given by $(1-i_f)$ and is applied to the reference sample that is at a distance of $i_f$ from the projection point, where $i_f$ is the fractional part of the displacement of the projection point, on the reference line, relative to the location [x][y] of the sample from which the projection point was projected. The third coefficient $f_i[2]$ is given by $i_f$ and is applied to the reference sample that is at a distance of $(1-i_f)$ from the projection point. For example, as shown in FIG. 21, for the example projection point 2102 that is at a fractional sample position of $i_f=20/32$ between the two references samples R1 and R2 on a reference sample line, coefficient $f_i[1]$ is applied to reference sample R1 and is equal to $(1-20/32)$ or 12/32, and coefficient $f_i[2]$ is applied to R2 and is equal to 20/32. As can be seen, the coefficients $f_i[1]$ and $f_i[2]$ are inversely related to the distance of their corresponding reference samples to the projection point and are determined to interpolate a value at the projection point by performing a normalized, weighted average.

Coefficients $f_s[n]$ include four coefficients. The second coefficient $f_s[1]$ and the third coefficient $f_s[2]$ are equal to zero and therefore may be disregarded. The first coefficient $f_s[0]$ and the fourth coefficient $f_s[3]$ are determined to interpolate a value at a projection point by performing a normalized, weighted average of the reference samples on a reference sample line that are one reference sample removed from the closest reference samples that the projection point falls between. In this case, smoothing is provided by interpolation. The first coefficient $f_s[0]$ is given by $((1-i_f)+1)/3$ and is applied to the reference sample that is at a distance of $i_f+1$ from the projection point, where $i_f$ is the fractional part of the displacement of the projection point, on the reference line, relative to the location [x][y] of the sample from which the projection point was projected. The fourth coefficient $f_i[3]$ is given by $(1+i_f)/3$ and is applied to the reference sample that is at a distance of $((1-i_f)+1)/3$ from the projection point. The division by 3 in each coefficient is to normalize the weights and is equal to the total distance between the reference samples. For example, as shown in FIG. 21, for the example projection point 2102 that is at a fractional sample position of $i_f=20/32$ between the two references samples R1 and R2 on a reference sample line, coefficient $f_i[0]$ is applied to reference sample R0 and is equal to $((1-20/32)+1)/3$, and coefficient $f_i[3]$ is applied to reference sample R3 and is equal to $(1+20/32)/3$. As can be seen, the coefficients $f_i[0]$ and $f_i[3]$ are inversely related to the distance of their corresponding reference samples to the projection point and are determined to interpolate a value at the projection point by performing a normalized, weighted average.

As mentioned above, exemplary coefficients $f_i[n]$ and coefficients $f_s[n]$ in FIG. 21 may be combined as in (21) after being adjusted by $\beta$ to create a single stage $\beta$ adjusted smoothing interpolation filter given by (22). In such an implementation, $\beta$ may be inversely related to the distance of a projection point from a closest integer sample position on a reference sample line that the projection point falls. For example, $\beta$ may be given by (23). In another example, $\beta$ may be directly related to the distance of a projection point from a closest integer sample position on a reference sample line that the projection point falls. For example, $\beta$ may be given by (24). Because coefficients $f_i[n]$, coefficients $f_s[n]$, and $\beta$ are all dependent on $i_f$, a set of FIR filters may be determined based on (21) for multiple values of $i_f$. For example, for $\frac{1}{32}$ sample accuracy, a set of 32 different FIR filters may be determined based on (21) for each possible value of $i_f$. In other examples, different levels of sample accuracy may be used. The coefficients for each of the FIR filters may be stored in a lookup table (LUT) and referenced based on a given value of $i_f$.

An example LUT of coefficients $f_{SIF}[n]$ for different values of $i_f$ is given below. The coefficients $f_{SIF}[n]$ in the LUT below were determined based on (21) by combining coefficients $f_i[n]$ and coefficients $f_s[n]$ in FIG. 21, with $\beta$ given by (23) and $\beta_0$=0.25. The coefficients $f_{SIF}[n]$ in the LUT below were calculated using floating point representation and then quantized so that their sum for each given $i_f$ is equal to 256.

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 0 | 0 | 256 | 0 | 0 |
| 1 | 3 | 244 | 8 | 1 |
| 2 | 5 | 233 | 15 | 3 |
| 3 | 8 | 221 | 23 | 4 |
| 4 | 10 | 210 | 30 | 6 |
| 5 | 12 | 199 | 37 | 8 |
| 6 | 14 | 189 | 44 | 9 |
| 7 | 17 | 178 | 50 | 11 |
| 8 | 19 | 168 | 56 | 13 |
| 9 | 21 | 158 | 62 | 15 |
| 10 | 22 | 149 | 68 | 17 |
| 11 | 24 | 139 | 73 | 20 |
| 12 | 26 | 130 | 78 | 22 |
| 13 | 28 | 121 | 83 | 24 |
| 14 | 29 | 112 | 88 | 27 |
| 15 | 31 | 104 | 92 | 29 |
| 16 | 32 | 96 | 96 | 32 |
| 17 | 29 | 92 | 104 | 31 |
| 18 | 27 | 88 | 112 | 29 |
| 19 | 24 | 83 | 121 | 28 |
| 20 | 22 | 78 | 130 | 26 |
| 21 | 20 | 73 | 139 | 24 |
| 22 | 17 | 68 | 149 | 22 |
| 23 | 15 | 62 | 158 | 21 |
| 24 | 13 | 56 | 168 | 19 |
| 25 | 11 | 50 | 178 | 17 |
| 26 | 9 | 44 | 189 | 14 |
| 27 | 8 | 37 | 199 | 12 |
| 28 | 6 | 30 | 210 | 10 |
| 29 | 4 | 23 | 221 | 8 |
| 30 | 3 | 15 | 233 | 5 |
| 31 | 1 | 8 | 244 | 3 |

Another example LUT of coefficients $f_{SIF}$ [n] for different values of $i_f$ is given below. The coefficients $f_{SIF}[n]$ in the LUT below were determined based on (21) by combining coefficients $f_i[n]$ and coefficients $f_s[n]$ in FIG. 21, with $\beta$ given by (23) and $\beta_0$=−0.3. The coefficients $f_{SIF}[n]$ in the LUT below were calculated using floating point representation.

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 0 | 0 | 256 | 0 | 0 |
| 1 | −1.575 | 250.325 | 8.075 | −0.825 |
| 2 | −3.1 | 244.5 | 16.3 | −1.7 |
| 3 | −4.575 | 238.525 | 24.675 | −2.625 |
| 4 | −6 | 232.4 | 33.2 | −3.6 |
| 5 | −7.375 | 226.125 | 41.875 | −4.625 |
| 6 | −8.7 | 219.7 | 50.7 | −5.7 |
| 7 | −9.975 | 213.125 | 59.675 | −6.825 |
| 8 | −11.2 | 206.4 | 68.8 | −8 |
| 9 | −12.375 | 199.525 | 78.075 | −9.225 |
| 10 | −13.5 | 192.5 | 87.5 | −10.5 |
| 11 | −14.575 | 185.325 | 97.075 | −11.825 |
| 12 | −15.6 | 178 | 106.8 | −13.2 |
| 13 | −16.575 | 170.525 | 116.675 | −14.625 |
| 14 | −17.5 | 162.9 | 126.7 | −16.1 |
| 15 | −18.375 | 155.125 | 136.875 | −17.625 |
| 16 | −19.2 | 147.2 | 147.2 | −19.2 |
| 17 | −17.625 | 136.875 | 155.125 | −18.375 |
| 18 | −16.1 | 126.7 | 162.9 | −17.5 |
| 19 | −14.625 | 116.675 | 170.525 | −16.575 |
| 20 | −13.2 | 106.8 | 178 | −15.6 |
| 21 | −11.825 | 97.075 | 185.325 | −14.575 |
| 22 | −10.5 | 87.5 | 192.5 | −13.5 |
| 23 | −9.225 | 78.075 | 199.525 | −12.375 |
| 24 | −8 | 68.8 | 206.4 | −11.2 |
| 25 | −6.825 | 59.675 | 213.125 | −9.975 |
| 26 | −5.7 | 50.7 | 219.7 | −8.7 |
| 27 | −4.625 | 41.875 | 226.125 | −7.375 |
| 28 | −3.6 | 33.2 | 232.4 | −6 |
| 29 | −2.625 | 24.675 | 238.525 | −4.575 |
| 30 | −1.7 | 16.3 | 244.5 | −3.1 |
| 31 | −0.825 | 8.075 | 250.325 | −1.575 |

After quantizing the coefficients in the above table to integer representation so that their sum for each given $i_f$ is equal to 256, the coefficients may have values as shown in the table below:

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 0 | 0 | 256 | 0 | 0 |
| 1 | −1 | 250 | 8 | −1 |
| 2 | −3 | 245 | 16 | −2 |
| 3 | −5 | 239 | 25 | −3 |
| 4 | −6 | 233 | 33 | −4 |
| 5 | −7 | 226 | 42 | −5 |
| 6 | −9 | 220 | 51 | −6 |
| 7 | −10 | 213 | 60 | −7 |
| 8 | −11 | 206 | 69 | −8 |
| 9 | −12 | 199 | 78 | −9 |
| 10 | −14 | 193 | 88 | −11 |
| 11 | −15 | 185 | 97 | −12 |
| 12 | −16 | 178 | 107 | −13 |
| 13 | −17 | 171 | 117 | −15 |
| 14 | −18 | 163 | 127 | −16 |
| 15 | −18 | 155 | 137 | −18 |
| 16 | −19 | 147 | 147 | −19 |
| 17 | −18 | 137 | 155 | −18 |
| 18 | −16 | 127 | 163 | −18 |
| 19 | −15 | 117 | 171 | −17 |
| 20 | −13 | 107 | 178 | −16 |
| 21 | −12 | 97 | 185 | −15 |
| 22 | −11 | 88 | 193 | −14 |
| 23 | −9 | 78 | 199 | −12 |
| 24 | −8 | 69 | 206 | −11 |
| 25 | −7 | 60 | 213 | −10 |
| 26 | −6 | 51 | 220 | −9 |
| 27 | −5 | 42 | 226 | −7 |
| 28 | −4 | 33 | 233 | −6 |
| 29 | −3 | 25 | 239 | −5 |

33

-continued

| i_f | f_SIF[0] | f_SIF[1] | f_SIF[2] | f_SIF[3] |
|---|---|---|---|---|
| | | $f_{SIF}[n]$ | | |
| 30 | −2 | 16 | 245 | −3 |
| 31 | −1 | 8 | 250 | −1 |

Another example LUT of coefficients $f_{SIF}[n]$ for different values of $i_f$ is given below. The coefficients $f_{SIF}[n]$ in the LUT below were determined based on (21) by combining coefficients $f_i[n]$ and coefficients $f_s[n]$ in FIG. 21, with β given by (23) and $β_0$=−0.2. The coefficients $f_{SIF}[n]$ in the LUT below were calculated using floating point representation.

| i_f | f_SIF[0] | f_SIF[1] | f_SIF[2] | f_SIF[3] |
|---|---|---|---|---|
| | | $f_{SIF}[n]$ | | |
| 0 | 0 | 256 | 0 | 0 |
| 1 | −1.05 | 249.55 | 8.05 | −0.55 |
| 2 | −2.066666667 | 243 | 16.2 | −1.133333333 |
| 3 | −3.05 | 236.35 | 24.45 | −1.75 |
| 4 | .4 | 229.6 | 32.8 | −2.4 |
| 5 | −4.916666667 | 222.75 | 41.25 | −3.083333333 |
| 6 | −5.8 | 215.8 | 49.8 | −3.8 |
| 7 | −6.65 | 208.75 | 58.45 | −4.55 |
| 8 | −7.466666667 | 201.6 | 67.2 | −5.333333333 |
| 9 | −8.25 | 194.35 | 76.05 | −6.15 |
| 10 | 9 | 187 | 85 | −7 |
| 11 | −9.716666667 | 179.55 | 94.05 | −7.883333333 |
| 12 | −10.4 | 172 | 103.2 | −8.8 |
| 13 | −11.05 | 164.35 | 112.45 | −9.75 |
| 14 | −11.66666667 | 156.6 | 121.8 | −10.73333333 |
| 15 | −12.25 | 148.75 | 131.25 | −11.75 |
| 16 | −12.8 | 140.8 | 140.8 | −12.8 |
| 17 | −11.75 | 131.25 | 148.75 | −12.25 |
| 18 | −10.73333333 | 121.8 | 156.6 | −11.66666667 |
| 19 | −9.75 | 112.45 | 164.35 | −11.05 |
| 20 | −8.8 | 103.2 | 172 | −10.4 |
| 21 | −7.883333333 | 94.05 | 179.55 | −9.716666667 |
| 22 | −7 | 85 | 187 | −9 |
| 23 | −6.15 | 76.05 | 194.35 | −8.25 |
| 24 | −5.333333333 | 67.2 | 201.6 | −7.466666667 |
| 25 | −4.55 | 58.45 | 208.75 | −6.65 |
| 26 | −3.8 | 49.8 | 215.8 | −5.8 |
| 27 | −3.083333333 | 41.25 | 222.75 | −4.916666667 |
| 28 | −2.4 | 32.8 | 229.6 | −4 |
| 29 | −1.75 | 24.45 | 236.35 | −3.05 |
| 30 | −1.133333333 | 16.2 | 243 | −2.066666667 |
| 31 | −0.55 | 8.05 | 249.55 | −1.05 |

After quantizing the coefficients in the above table to integer representation so that their sum for each given $i_f$ is equal to 256, the coefficients may have values as shown in the table below:

| i_f | f_SIF[0] | f_SIF[1] | f_SIF[2] | f_SIF[3] |
|---|---|---|---|---|
| | | $f_{SIF}[n]$ | | |
| 0 | 0 | 256 | 0 | 0 |
| 1 | −1 | 250 | 8 | −1 |
| 2 | −2 | 243 | 16 | −1 |
| 3 | −3 | 236 | 25 | −2 |
| 4 | −4 | 230 | 33 | −3 |
| 5 | −5 | 223 | 41 | −3 |
| 6 | −6 | 216 | 50 | −4 |
| 7 | −7 | 209 | 58 | −4 |
| 8 | −8 | 202 | 67 | −5 |
| 9 | −8 | 194 | 76 | −6 |
| 10 | −9 | 187 | 85 | −7 |

34

-continued

| i_f | f_SIF[0] | f_SIF[1] | f_SIF[2] | f_SIF[3] |
|---|---|---|---|---|
| | | $f_{SIF}[n]$ | | |
| 11 | −10 | 180 | 94 | −8 |
| 12 | −10 | 172 | 103 | −9 |
| 13 | −11 | 164 | 113 | −10 |
| 14 | −12 | 157 | 122 | −11 |
| 15 | −12 | 149 | 131 | −12 |
| 16 | −13 | 141 | 141 | −13 |
| 17 | −12 | 131 | 149 | −12 |
| 18 | −11 | 122 | 157 | −12 |
| 19 | −10 | 113 | 164 | −11 |
| 20 | −9 | 103 | 172 | −10 |
| 21 | −8 | 94 | 180 | −10 |
| 22 | −7 | 85 | 187 | −9 |
| 23 | −6 | 76 | 194 | −8 |
| 24 | −5 | 67 | 202 | −8 |
| 25 | −4 | 58 | 209 | −7 |
| 26 | −4 | 50 | 216 | −6 |
| 27 | −3 | 41 | 223 | −5 |
| 28 | −3 | 33 | 230 | −4 |
| 29 | −2 | 25 | 236 | −3 |
| 30 | −1 | 16 | 243 | −2 |
| 31 | −1 | 8 | 250 | −1 |

Another example LUT of coefficients $f_{SIF}[n]$ for different values of $i_f$ is given below. The coefficients $f_{SIF}[n]$ in the LUT below were determined based on (21) by combining coefficients $f_i[n]$ and coefficients $f_s[n]$ in FIG. 21, with β given by (23) and $β_0$=−0.1. The coefficients $f_{SIF}[n]$ in the LUT below were calculated using floating point representation.

| i_f | f_SIF[0] | f_SIF[1] | f_SIF[2] | f_SIF[3] |
|---|---|---|---|---|
| | | $f_{SIF}[n]$ | | |
| 0 | 0 | 256 | 0 | 0 |
| 1 | −0.525 | 248.775 | 8.025 | −0.275 |
| 2 | −1.033333333 | 241.5 | 16.1 | 0.566666667 |
| 3 | −1.525 | 234.175 | 24.225 | −0.875 |
| 4 | −2 | 226.8 | 32.4 | −1.2 |
| 5 | −2.458333333 | 219.375 | 40.625 | −1.541666667 |
| 6 | −2.9 | 211.9 | 48.9 | −1.9 |
| 7 | −3.325 | 204.375 | 57.225 | −2.275 |
| 8 | −3.733333333 | 196.8 | 65.6 | −2.666666667 |
| 9 | −4.125 | 189.175 | 74.025 | −3.075 |
| 10 | −4.5 | 181.5 | 82.5 | −3.5 |
| 11 | −4.858333333 | 173.775 | 91.025 | −3.941666667 |
| 12 | −5.2 | 166 | 99.6 | −4.4 |
| 13 | −5.525 | 158.175 | 108.225 | −4.875 |
| 14 | −5.833333333 | 150.3 | 116.9 | −5.366666667 |
| 15 | −6.125 | 142.375 | 125.625 | −5.875 |
| 16 | −6.4 | 134.4 | 134.4 | −6.4 |
| 17 | −5.875 | 125.625 | 142.375 | −6.125 |
| 18 | −5.366666667 | 116.9 | 150.3 | −5.833333333 |
| 19 | −4.875 | 108.225 | 158.175 | −5.525 |
| 20 | −4.4 | 99.6 | 166 | −5.2 |
| 21 | −3.941666667 | 91.025 | 173.775 | −4.858333333 |
| 22 | −3.5 | 82.5 | 181.5 | −4.5 |
| 23 | −3.075 | 74.025 | 189.175 | −4.125 |
| 24 | −2.666666667 | 65.6 | 196.8 | −3.733333333 |
| 25 | −2.275 | 57.225 | 204.375 | −3.325 |
| 26 | −1.9 | 48.9 | 211.9 | −2.9 |
| 27 | −1.541666667 | 40.625 | 219.375 | −2.458333333 |
| 28 | −1.2 | 32.4 | 226.8 | −2 |
| 29 | −0.875 | 24.225 | 234.175 | −1.525 |
| 30 | −0.566666667 | 16.1 | 241.5 | −1.033333333 |
| 31 | −0.275 | 8.025 | 248.775 | −0.525 |

After quantizing the coefficients in the above table to integer representation so that their sum for each given $i_f$ is equal to 256, the coefficients may have values as shown in the table below:

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 0 | 0 | 256 | 0 | 0 |
| 1 | −1 | 249 | 8 | 0 |
| 2 | −1 | 242 | 16 | −1 |
| 3 | −1 | 234 | 24 | −1 |
| 4 | −2 | 227 | 32 | −1 |
| 5 | −2 | 219 | 41 | −2 |
| 6 | −3 | 212 | 49 | −2 |
| 7 | −3 | 204 | 57 | −2 |
| 8 | −4 | 197 | 66 | −3 |
| 9 | −4 | 189 | 74 | −3 |
| 10 | −5 | 182 | 83 | −4 |
| 11 | −5 | 174 | 91 | −4 |
| 12 | −5 | 166 | 100 | −5 |
| 13 | −5 | 158 | 108 | −5 |
| 14 | −6 | 150 | 117 | −5 |
| 15 | −6 | 142 | 126 | −6 |
| 16 | −6 | 134 | 134 | −6 |
| 17 | −6 | 126 | 142 | −6 |
| 18 | −5 | 117 | 150 | −6 |
| 19 | −5 | 108 | 158 | −5 |
| 20 | −5 | 100 | 166 | −5 |
| 21 | −4 | 91 | 174 | −5 |
| 22 | −4 | 83 | 182 | −5 |
| 23 | −3 | 74 | 189 | −4 |
| 24 | −3 | 66 | 197 | −4 |
| 25 | −2 | 57 | 204 | −3 |
| 26 | −2 | 49 | 212 | −3 |
| 27 | −2 | 41 | 219 | −2 |
| 28 | −1 | 32 | 227 | −2 |
| 29 | −1 | 24 | 234 | −1 |
| 30 | −1 | 16 | 242 | −1 |
| 31 | 0 | 8 | 249 | −1 |

Another example LUT of coefficients $f_{SIF}$[n] for different values of $i_f$ is given below. The coefficients $f_{SIF}$[n] in the LUT below were determined based on (21) by combining coefficients $f_i$[n] and coefficients $f_s$[n] in FIG. 21, with β given by (23) and $β_0$=0.1. The coefficients $f_{SIF}$ [n] in the LUT below were calculated using floating point representation.

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 0 | 0 | 256 | 0 | 0 |
| 1 | 0.525 | 247.225 | 7.975 | 0.275 |
| 2 | 1.033333333 | 238.5 | 15.9 | 0.566666667 |
| 3 | 1.525 | 229.825 | 23.775 | 0.875 |
| 4 | 2 | 221.2 | 31.6 | 1.2 |
| 5 | 2.458333333 | 212.625 | 39.375 | 1.541666667 |
| 6 | 2.9 | 204.1 | 47.1 | 1.9 |
| 7 | 3.325 | 195.625 | 54.775 | 2.275 |
| 8 | 3.733333333 | 187.2 | 62.4 | 2.666666667 |
| 9 | 4.125 | 178.825 | 69.975 | 3.075 |
| 10 | 4.5 | 170.5 | 77.5 | 3.5 |
| 11 | 4.858333333 | 162.225 | 84.975 | 3.941666667 |
| 12 | 5.2 | 154 | 92.4 | 4.4 |
| 13 | 5.525 | 145.825 | 99.775 | 4.875 |
| 14 | 5.833333333 | 137.7 | 107.1 | 5.366666667 |
| 15 | 6.125 | 129.625 | 114.375 | 5.875 |
| 16 | 6.4 | 121.6 | 121.6 | 6.4 |
| 17 | 5.875 | 114.375 | 129.625 | 6.125 |
| 18 | 5.366666667 | 107.1 | 137.7 | 5.833333333 |
| 19 | 4.875 | 99.775 | 145.825 | 5.525 |
| 20 | 4.4 | 92.4 | 154 | 5.2 |
| 21 | 3.941666667 | 84.975 | 162.225 | 4.858333333 |
| 22 | 3.5 | 77.5 | 170.5 | 4.5 |
| 23 | 3.075 | 69.975 | 178.825 | 4.125 |
| 24 | 2.666666667 | 62.4 | 187.2 | 3.733333333 |
| 25 | 2.275 | 54.775 | 195.625 | 3.325 |
| 26 | 1.9 | 47.1 | 204.1 | 2.9 |
| 27 | 1.541666667 | 39.375 | 212.625 | 2.458333333 |

-continued

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 28 | 1.2 | 31.6 | 221.2 | 2 |
| 29 | 0.875 | 23.775 | 229.825 | 1.525 |
| 30 | 0.566666667 | 15.9 | 238.5 | 1.033333333 |
| 31 | 0.275 | 7.975 | 247.225 | 0.525 |

After quantizing the coefficients in the above table to integer representation so that their sum for each given $i_f$ is equal to 256, the coefficients may have values as shown in the table below:

| $i_f$ | $f_{SIF}$ [n] | | | |
|---|---|---|---|---|
| | $f_{SIF}$ [0] | $f_{SIF}$ [1] | $f_{SIF}$ [2] | $f_{SIF}$ [3] |
| 0 | 0 | 256 | 0 | 0 |
| 1 | 1 | 247 | 8 | 0 |
| 2 | 1 | 238 | 16 | 1 |
| 3 | 1 | 230 | 24 | 1 |
| 4 | 2 | 221 | 32 | 1 |
| 5 | 2 | 213 | 39 | 2 |
| 6 | 3 | 204 | 47 | 2 |
| 7 | 3 | 196 | 55 | 2 |
| 8 | 4 | 187 | 62 | 3 |
| 9 | 4 | 179 | 70 | 3 |
| 10 | 4 | 171 | 77 | 4 |
| 11 | 5 | 162 | 85 | 4 |
| 12 | 5 | 154 | 93 | 4 |
| 13 | 5 | 146 | 100 | 5 |
| 14 | 6 | 138 | 107 | 5 |
| 15 | 6 | 130 | 114 | 6 |
| 16 | 6 | 122 | 122 | 6 |
| 17 | 6 | 114 | 130 | 6 |
| 18 | 5 | 107 | 138 | 6 |
| 19 | 5 | 100 | 146 | 5 |
| 20 | 4 | 93 | 154 | 5 |
| 21 | 4 | 85 | 162 | 5 |
| 22 | 4 | 77 | 171 | 4 |
| 23 | 3 | 70 | 179 | 4 |
| 24 | 3 | 62 | 187 | 4 |
| 25 | 2 | 55 | 196 | 3 |
| 26 | 2 | 47 | 204 | 3 |
| 27 | 2 | 39 | 213 | 2 |
| 28 | 1 | 32 | 221 | 2 |
| 29 | 1 | 24 | 230 | 1 |
| 30 | 1 | 16 | 238 | 1 |
| 31 | 0 | 8 | 247 | 1 |

Figure 22:
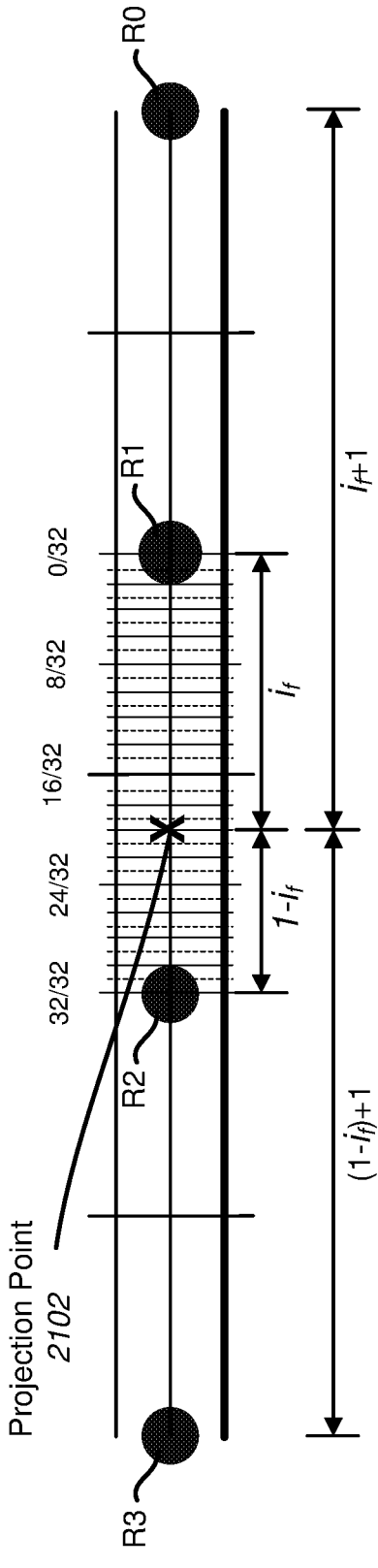
FIG. 22 illustrates example coefficients that may be implemented by the smoothing interpolation filter in FIG. 19 in accordance with embodiments of the present disclosure.

FIG. 22 illustrates example coefficients that may be implemented by smoothing interpolation filter 1900 in FIG. 19 in accordance with embodiments of the present disclosure. More specifically, FIG. 22 illustrates example coefficients $f_i$[n] that may be implemented by β adjusted interpolation filter 1904 given by (20), and example coefficients $f_s$[n] that may be implemented by β adjusted smoothing filter 1906 given by (19). Coefficients $f_s$[n] and coefficients $f_s$[n] may be combined as in (21) after being adjusted by β to create a single stage β adjusted smoothing interpolation filter given by (22).

Coefficients $f_i$[n] include four coefficients and are determined in the same manner as discussed above with respect to FIG. 21. Coefficients $f_s$[n] are determined based on two sets of filter coefficients, $f_{s1}$[n] and $f_{s2}$ [n], and may be combined by adding corresponding coefficients to form the single coefficient set $f_s$[n]. Coefficients $f_{s1}$[n] implement a [1,2,1]/4 smoothing filter with the fourth coefficient $f_{s1}$[3] equal to zero. Coefficients $f_{s2}$ [n] implement a [1,2,1]/4 smoothing filter with the first coefficient $f_{s1}$[0] equal to zero.

Coefficients $f_{s1}[n]$ and $f_{s2}[n]$ are further adjusted based on weights given by $(1-i_f)$ and $i_f$, respectively.

As mentioned above, exemplary coefficients $f_i[n]$ and coefficients $f_s[n]$ in FIG. 22 may be combined as in (21) after being adjusted by β to create a single stage β adjusted smoothing interpolation filter given by (22). β may be inversely related to the distance of a projection point from a closest integer sample position on a reference sample line that the projection point falls in such an implementation. For example, β may be given by (23). In another example, β may be directly related to the distance of a projection point from a closest integer sample position on a reference sample line that the projection point falls. For example, β may be given by (24). Because coefficients $f_i[n]$, coefficients $f_s[n]$, and β are all dependent on $i_f$, a set of FIR filters may be determined based on (21) for multiple values of $i_f$. For example, for $\frac{1}{32}$ sample accuracy, a set of 32 different FIR filters may be determined based on (21) for each possible value of $i_f$. In other examples, different levels of sample accuracy may be used. The coefficients for each of the FIR filters may be stored in a lookup table and referenced based on a given value of $i_f$.

In the above descriptions, an example sample accuracy of $\frac{1}{32}$ was used in many calculations and for many parameters. For example, for $i_f$, a sample accuracy of $\frac{1}{32}$ was used. It will be understood that any reasonable sample accuracy may be used in the above calculations and parameters, including $\frac{1}{32}$, $\frac{1}{64}$, and $\frac{1}{128}$ to name a few. In addition, it will be understood that the above calculations may be modified to avoid floating point operations, which may be desirable for many hardware implementations. For example, to avoid floating point operations in the above calculations while preserving the specified accuracy of a fractional number, the fractional number (or calculations and/or functions using the fractional number) may be multiplied by the reciprocal of the fractional number's specified accuracy. For example, $i_f$ (or calculations and/or functions using $i_f$) with a precision of $\frac{1}{32}$ may be multiplied by 32 to put $i_f$ in integer form. Calculations may then be performed with $i_f$ in integer form and the results of the calculations may then be divided by the reciprocal of the accuracy using, for example, right shift operations. For example, the function β, such as those given by (23) and (24), and the functions of coefficients $f_i[n]$, coefficients $f_s[n]$ in FIGS. 21 and 22 are each dependent on fractional number $i_f$. To avoid floating point operations when evaluating these functions, the functions may be multiplied by the reciprocal of the fractional number $i_f$'s specified accuracy to put all numbers in integer form. After completing the evaluation of the function, the result may then be divided by the fractional number $i_f$'s specified accuracy.

FIG. 23 illustrates a flowchart 2300 of a method for determining a prediction of a sample based on an interpolated value in accordance with embodiments of the present disclosure. The method of flowchart 2300 may be implemented by an encoder or decoder, such as encoder 200 in FIG. 2 or decoder 300 in FIG. 3.

The method of flowchart 2300 begins at 2302. At 2302, a location of a sample is projected to a point on a reference sample line. In an embodiment, the location of the sample is projected in an angular direction. The angular direction may be indicated by an angular intra prediction mode. In another embodiment, the location of the sample is projected in a direction indicated by a vector, such as motion vector used in inter prediction or IBC block vector used IBC.

At 2304, a first filter coefficient and a second filter coefficient are determined based on a first function that is related to a distance of the point from a closet integer position on the reference sample line. In an embodiment, the first function is inversely related to the distance of the point from the closest integer position on the reference sample line based on a linear inverse relationship. In another embodiment, the first function is inversely related to the distance of the point from the closest integer position on the reference sample line based on a non-linear inverse relationship. The first function may be given by one of the β functions described above with respect to FIG. 20. In an embodiment, the first and second filter coefficients may be selected from a lookup table based on a fractional part of a displacement of the point on the reference sample line relative to the location of the sample.

In an embodiment, the first filter coefficient at 2304 is further determined based on a second function that is inversely related to a distance of the point from the first reference sample. For example, at 2304, the first filter coefficient is determined based on a product of the first function and the second function. The first function may be given by $(\frac{1}{2}-|\frac{1}{2}-i_f|)\cdot2\beta_0$, where $i_f$ is equal to a fractional part of a displacement of the point on the reference sample line relative to the location of the sample; and $\beta_0$ is a value between 0 and 1. The second function may be given by $((1-i_f)+1)/3$, where $i_f$ is equal to a fractional part of a displacement of the point on the reference sample line relative to the location of the sample. In another example, the second function may be given by $(i_f+1)/3$, where $i_f$ is equal to a fractional part of a displacement of the point on the reference sample line relative to the location of the sample.

At 2306, an interpolated value at the point is determined by interpolating between a first reference sample and a second reference sample by applying the first filter coefficient to the first reference sample and the second filter coefficient to the second reference sample. In an embodiment, the first reference sample is at least one integer sample position removed from the point in a first direction on the reference sample line and the second reference sample is at least one integer sample position removed from the point in a second direction on the reference sample line.

At 2308, a prediction of the sample is determined based on the interpolated value.

In an embodiment, the method of 2300 may further comprise interpolating between a third reference sample and a fourth reference sample to determine a second interpolated value at the point. The interpolating between the third reference sample and the fourth reference sample may comprise applying a third filter coefficient to the third reference sample and a fourth filter coefficient to the fourth reference sample. Both the third filter coefficient and the fourth filter coefficient may be determined based on a third function that is directly related to the distance of the point from the closest integer position on the reference sample line. The prediction of the sample may be further determined based on the second interpolated value. In an embodiment, the third function may be given by $\beta_0-((\frac{1}{2}-|\frac{1}{2}-i_f|)\cdot2\beta_0)$, where $i_f$ is equal to a fractional part of a displacement of the point on the reference sample line relative to the location of the sample and Po is a value between 0 and 1.

In an embodiment, the third filter coefficient may be further determined based on a fourth function that is inversely related to a distance of the point from the third reference sample. In an embodiment, the third filter coefficient may be determined based on a product of the third function and the fourth function. In an embodiment, the fourth function may be given by $i_f$, where $i_f$ is equal to a fractional part of a displacement of the point on the reference sample line relative to the location of the sample. In another embodiment, the fourth function may be given by $1-i_f$, where $i_f$ is equal to a fractional part of a displacement of the point on the reference sample line relative to the location of the sample.

FIG. 24 illustrates a flowchart 2400 of a method for determining a prediction of a sample in accordance with embodiments of the present disclosure. The method of flowchart 2400 may be implemented by an encoder or decoder, such as encoder 200 in FIG. 2 or decoder 300 in FIG. 3.

The method of flowchart 2400 begins at 2402. At 2402, a location of a sample is projected to a point on a reference sample line between a plurality of reference samples.

At 2404, first filter coefficients are determined based on a first function that is related to a distance of the point from a closest integer position on the reference sample line. In an embodiment, the first function is given by $(\frac{1}{2}-|\frac{1}{2}-i_f|)\cdot 2\beta_0$, where $i_f$ is equal to a fractional part of a displacement of the point on the reference sample line relative to the location of the sample and Po is a value between 0 and 1.

At 2406, the first filter coefficients are applied to the plurality of reference samples to determine a first filtered value. In an embodiment, applying the first filter coefficients comprises applying a coefficient of the first filter coefficients to a reference sample of the plurality of reference samples. The coefficient of the first filter coefficients may be further determined based on a second function that is inversely related to a fractional part of a displacement of the point on the reference sample line relative to the location of the sample. In an embodiment, the second function is given by $((1-i_f)+1)/3$, where $i_f$ is equal to the fractional part of the displacement of the point on the reference sample line relative to the location of the sample. In another embodiment, the second function is given by $(i_f+1)/3$, where $i_f$ is equal to the fractional part of the displacement of the point on the reference sample line relative to the location of the sample.

At 2408, a prediction of the sample is determined based on the first filtered value.

In an embodiment, the method of flowchart 2400 further comprises applying, to the plurality of reference samples, second filter coefficients to determine a second filtered value. The second filter coefficients may be determined based on a second function that is directly related to the distance of the point from the closest integer position on the reference sample line. In an embodiment, the second function may be given by $1-((\frac{1}{2}-|\frac{1}{2}-i_f|)\cdot 2\beta_0)$, where $i_f$ is equal to a fractional part of a displacement of the point on the reference sample line relative to the location of the sample and $\beta_0$ is a value between 0 and 1. In an embodiment, applying the second filter coefficients comprises applying a coefficient of the second filter coefficients to a reference sample of the plurality of reference samples. The coefficient of the second filter coefficients may be determined based on a third function that is inversely related to a fractional part of a displacement of the point on the reference sample line relative to the location of the sample. In an embodiment, the third function is given by $1-i_f$ and $i_f$ is equal to the fractional part of the displacement of the point on the reference sample line relative to the location of the sample. In another embodiment, the third function is given by $i_f$, where $i_f$ is equal to the fractional part of the displacement of the point on the reference sample line relative to the location of the sample.

Figure 25:
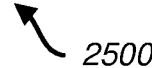
FIG. 25 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2500 is shown in FIG. 25. Blocks depicted in the figures above, such as the blocks in FIGS. 1, 2, and 3, may execute on one or more computer systems 2500. Furthermore, each of the steps of the flowcharts depicted in this disclosure may be implemented on one or more computer systems 2500.

Computer system 2500 includes one or more processors, such as processor 2504. Processor 2504 may be, for example, a special purpose processor, general purpose processor, microprocessor, or digital signal processor. Processor 2504 may be connected to a communication infrastructure 2502 (for example, a bus or network). Computer system 2500 may also include a main memory 2506, such as random access memory (RAM), and may also include a secondary memory 2508.

Secondary memory 2508 may include, for example, a hard disk drive 2510 and/or a removable storage drive 2512, representing a magnetic tape drive, an optical disk drive, or the like. Removable storage drive 2512 may read from and/or write to a removable storage unit 2516 in a well-known manner. Removable storage unit 2516 represents a magnetic tape, optical disk, or the like, which is read by and written to by removable storage drive 2512. As will be appreciated by persons skilled in the relevant art(s), removable storage unit 2516 includes a computer usable storage medium having stored therein computer software and/or data.

In alternative implementations, secondary memory 2508 may include other similar means for allowing computer programs or other instructions to be loaded into computer system 2500. Such means may include, for example, a removable storage unit 2518 and an interface 2514. Examples of such means may include a program cartridge and cartridge interface (such as that found in video game devices), a removable memory chip (such as an EPROM or PROM) and associated socket, a thumb drive and USB port, and other removable storage units 2518 and interfaces 2514 which allow software and data to be transferred from removable storage unit 2518 to computer system 2500.

Computer system 2500 may also include a communications interface 2520. Communications interface 2520 allows software and data to be transferred between computer system 2500 and external devices. Examples of communications interface 2520 may include a modem, a network interface (such as an Ethernet card), a communications port, etc. Software and data transferred via communications interface 2520 are in the form of signals which may be electronic, electromagnetic, optical, or other signals capable of being received by communications interface 2520. These signals are provided to communications interface 2520 via a communications path 2522. Communications path 2522 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2516 and 2518 or a hard disk installed in hard disk drive 2510. These computer program products are means for providing software to computer system 2500. Computer programs (also called computer control logic) may be stored in main memory 2506 and/or secondary memory 2508.

Computer programs may also be received via communications interface 2520. Such computer programs, when executed, enable the computer system 2500 to implement the present disclosure as discussed herein. In particular, the computer programs, when executed, enable processor 2504 to implement the processes of the present disclosure, such as any of the methods described herein. Accordingly, such computer programs represent controllers of the computer system 2500.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:

1. A method comprising:

projecting a location of a sample to a point on a reference sample line;

interpolating between a first reference sample and a second reference sample to determine an interpolated value at the point, wherein:

the interpolating comprises applying:

a first filter coefficient, determined based on a product of a first function and a second function that is inversely related to a first distance of the point from the first reference sample, to the first reference sample; and a second filter coefficient, determined based on a product of the first function and a third function that is inversely related to a second distance of the point from the second reference sample, to the second reference sample; and the first function is inversely related to a distance of the point from a halfway position between two closest integer positions on the reference sample line;

interpolating between a third reference sample and a fourth reference sample to determine a second interpolated value at the point, wherein:

the interpolating between third reference sample and the fourth reference sample comprises applying:

a third filter coefficient to the third reference sample; and a fourth filter coefficient to the fourth reference sample;

both the third filter coefficient and the fourth filter coefficient are determined based on a fourth function that is directly related to the distance of the point from the halfway position between two closest integer positions on the reference sample line; and the fourth function is inversely related to the first function; and determining a prediction of the sample based on the interpolated value and the second interpolated value.

2. The method of claim 1, wherein:

the first function is given by $(\frac{1}{2}-|\frac{1}{2}-i_f|)\cdot2\beta_0$;

$i_f$ is equal to a fractional part of a displacement of the point on the reference sample line relative to the location of the sample; and $\beta_0$ is a value between 0 and 1.

3. The method of claim 1, wherein for is being equal to a fractional part of a displacement of the point on the reference sample line relative to the location of the sample, the second function is given by:

$$((1-i_f)+1)/3; \text{ or}$$

$$(i_f+1)/3.$$

4. The method of claim 1, further comprising selecting the first and second filter coefficients from a lookup table based on a fractional part of a displacement of the point on the reference sample line relative to the location of the sample.

5. The method of claim 1, wherein:

the first reference sample is at least one integer sample position removed from the point in a first direction on the reference sample line; and the second reference sample is at least one integer sample position removed from the point in a second direction on the reference sample line.

6. The method of claim 1, wherein the first function is inversely related to the distance of the point from the halfway position between the two closest integer positions on the reference sample line based on a linear inverse relationship.

7. The method of claim 1, wherein the first function is inversely related to the distance of the point from the halfway position between the two closest integer positions on the reference sample line based on a non-linear inverse relationship.

8. The method of claim 1, wherein the location of the sample is projected in an angular direction.

9. A decoder comprising:

one or more processors; and memory storing instructions that, when executed by the one or more processors, cause the decoder to:

project a location of a sample to a point on a reference sample line;

interpolate between a first reference sample and a second reference sample to determine an interpolated value at the point, wherein:

the interpolating comprises applying:

a first filter coefficient, determined based on a product of a first function and a second function that is inversely related to a first distance of the point from the first reference sample, to the first reference sample; and a second filter coefficient, determined based on a product of the first function and a third function that is inversely related to a second distance of the point from the second reference sample, to the second reference sample; and the first function is inversely related to a distance of the point from a halfway position between two closest integer positions on the reference sample line;

interpolate between a third reference sample and a fourth reference sample to determine a second interpolated value at the point, wherein:

the interpolating between third reference sample and the fourth reference sample comprises applying:

a third filter coefficient to the third reference sample; and a fourth filter coefficient to the fourth reference sample;

both the third filter coefficient and the fourth filter coefficient are determined based on a fourth function that is directly related to the distance of the point from the halfway position between two closest integer positions on the reference sample line; and the fourth function is inversely related to the first function; and determine a prediction of the sample based on the interpolated value and the second interpolated value.

10. The decoder of claim 9, wherein:

the first function is given by $(\frac{1}{2}-|\frac{1}{2}-i_f|)\cdot 2\beta_0$;

$i_f$ is equal to a fractional part of a displacement of the point on the reference sample line relative to the location of the sample; and $\beta_0$ is a value between 0 and 1.

11. The decoder of claim 9, wherein for is being equal to a fractional part of a displacement of the point on the reference sample line relative to the location of the sample, the second function is given by:

$$((1-i_f)+1)/3; \text{ or}$$

$$(i_f+1)/3.$$

12. The decoder of claim 9, wherein the instructions, when executed by the one or more processors, further cause the decoder to select the first and second filter coefficients from a lookup table based on a fractional part of a displacement of the point on the reference sample line relative to the location of the sample.

13. The decoder of claim 9, wherein:

the first reference sample is at least one integer sample position removed from the point in a first direction on the reference sample line; and the second reference sample is at least one integer sample position removed from the point in a second direction on the reference sample line.

14. The decoder of claim 9, wherein the first function is inversely related to the distance of the point from the halfway position between the two closest integer positions on the reference sample line based on a linear inverse relationship.

15. The decoder of claim 9, wherein the first function is inversely related to the distance of the point from the halfway position between the two closest integer positions on the reference sample line based on a non-linear inverse relationship.

16. The decoder of claim 9, wherein the location of the sample is projected in an angular direction.

17. A non-transitory computer-readable medium comprising instructions that, when executed by one or more processors of a decoder, cause the decoder to:

project a location of a sample to a point on a reference sample line;

interpolate between a first reference sample and a second reference sample to determine an interpolated value at the point, wherein:

the interpolating comprises applying:

a first filter coefficient, determined based on a product of a first function and a second function that is inversely related to a first distance of the point from the first reference sample, to the first reference sample; and a second filter coefficient, determined based on a product of the first function and a third function that is inversely related to a second distance of the point from the second reference sample, to the second reference sample; and the first function is inversely related to a distance of the point from a halfway position between two closest integer positions on the reference sample line;

interpolate between a third reference sample and a fourth reference sample to determine a second interpolated value at the point, wherein:

the interpolating between third reference sample and the fourth reference sample comprises applying:

a third filter coefficient to the third reference sample; and a fourth filter coefficient to the fourth reference sample;

both the third filter coefficient and the fourth filter coefficient are determined based on a fourth function that is directly related to the distance of the point from the halfway position between two closest integer positions on the reference sample line; and the fourth function is inversely related to the first function; and determine a prediction of the sample based on the interpolated value and the second interpolated value.

18. The non-transitory computer-readable medium of claim 17, wherein:

the first function is given by $(\frac{1}{2}-|\frac{1}{2}-i_f|)\cdot 2\beta_0$;

the second function is given by:

$$((1-i_f)+1)/3; \text{ or}$$

$$(i_f+1)/3;$$

$i_f$ is equal to a fractional part of a displacement of the point on the reference sample line relative to the location of the sample; and $\beta_0$ is a value between 0 and 1.

19. The non-transitory computer-readable medium of claim 17, wherein the instructions, when executed by the one or more processors, further cause the decoder to select the first and second filter coefficients from a lookup table based on a fractional part of a displacement of the point on the reference sample line relative to the location of the sample.

20. The non-transitory computer-readable medium of claim 17, wherein the location of the sample is projected in an angular direction.

* * * * *